United States Patent
Eisenhour

(10) Patent No.: US 8,567,206 B2
(45) Date of Patent: Oct. 29, 2013

(54) VEHICLE AIR CONDITIONING SYSTEM

(75) Inventor: Ronald S. Eisenhour, West Bloomfield, MI (US)

(73) Assignee: Nissan North America, Ic., Franklin, TN (US)

( * ) Notice: Subject to any disclaimer, the term of this patent is extended or adjusted under 35 U.S.C. 154(b) by 994 days.

(21) Appl. No.: 12/633,099

(22) Filed: Dec. 8, 2009

(65) Prior Publication Data
US 2011/0132014 A1 Jun. 9, 2011

(51) Int. Cl.
*B60H 1/32* (2006.01)

(52) U.S. Cl.
USPC ............. 62/228.1; 62/228.3; 62/239; 62/244; 62/157; 62/158; 62/231

(58) Field of Classification Search
USPC ............. 62/228.1, 228.3, 239, 244, 157, 158, 62/231; 236/1 C
See application file for complete search history.

(56) References Cited

U.S. PATENT DOCUMENTS

| | | | |
|---|---|---|---|
| 6,427,465 B1 | 8/2002 | Bednarchik et al. | |
| 6,430,953 B2 * | 8/2002 | Roh | 62/231 |
| 7,886,552 B2 * | 2/2011 | Wang et al. | 62/228.1 |
| 2004/0134207 A1 | 7/2004 | Morita et al. | |

* cited by examiner

*Primary Examiner* — Cheryl J. Tyler
*Assistant Examiner* — Jonathan Bradford
(74) *Attorney, Agent, or Firm* — Global IP Counselors, LLP

(57) ABSTRACT

A vehicle air conditioning system includes a controller that initially controls operation of a compressor to switch between inactive and active states in response to detecting that an operating condition is equal to or surpasses a first operation threshold. The controller determines a first time delay occurring between initiating the switch from one of the inactive and active states to the other of the compressor, and an actual change in the operating condition. The controller subsequently defines a first limit that is offset from the first operation threshold such that the controller controls the operation of the compressor to subsequently switch from the one of inactive and active states to the other in response to detecting that the operating condition is equal to or surpasses the first limit.

22 Claims, 12 Drawing Sheets

VEHICLE AIR CONDITIONING SYSTEM

BACKGROUND OF THE INVENTION

1. Field of the Invention

The present invention relates to a vehicle air conditioning system. More specifically, the present invention relates to a controller for a vehicle air conditioning system that operates a compressor of the vehicle air conditioning system.

2. Background Information

Vehicles typically include an air conditioning system. Such air conditioning systems typically include a compressor that is cycled on and off to compress refrigerant, a condenser that dissipates heat held in the compressed refrigerant, an expansion device that expands and lowers the pressure of the compressed refrigerant and an evaporator arranged within the vehicle to absorb heat from within a passenger compartment of the vehicle. The compressor is usually controlled with a feedback circuit that includes detection of, for example, refrigerant pressure conditions in the low pressure section of the air conditioning system or temperature conditions at or near the evaporator.

Such air conditioning systems are not always energy efficient or effective at all times. Specifically, fluctuations in operating and ambient conditions can effect operation of the air conditioning system. For example, changes in engine RPMs, changes in weather conditions and changes in vehicle speed that effect condenser operation, among other things, can affect the effectiveness of the air conditioning system.

SUMMARY OF THE INVENTION

One object of the present invention is to operate an air conditioning system such that icing at the evaporator is minimized.

Another object of the present invention is to operate an air conditioning system with optimal passenger comfort.

Still another object of the present invention is to operate an air conditioning system in an economical manner.

In accordance with one aspect of the claimed invention, a vehicle air conditioning system includes an air conditioning evaporator, a compressor, a sensor and a controller. The air conditioning evaporator has a prescribed operating range bounded by at least a first operation threshold. The compressor is in fluid communication with the air conditioning evaporator. The sensor is arranged to detect an operating condition of the air conditioning evaporator. The controller is operably connected to the sensor and the compressor. The controller initially controls operation of the compressor to switch from one of inactive and active states to the other in response to detecting that the operating condition is equal to or surpasses the first operation threshold. The controller further determines a first time delay corresponding to a time occurring between initiating the switch from the one of the inactive and active states to the other of the compressor and an actual change in the operating condition due to the switch from the one of the inactive and active states to the other of the compressor. The controller further subsequently defines a first limit that is offset from the first operation threshold such that the controller controls the operation of the compressor to subsequently switch from the one of inactive and active states to the other in response to detecting that the operating condition is equal to or surpasses the first limit.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
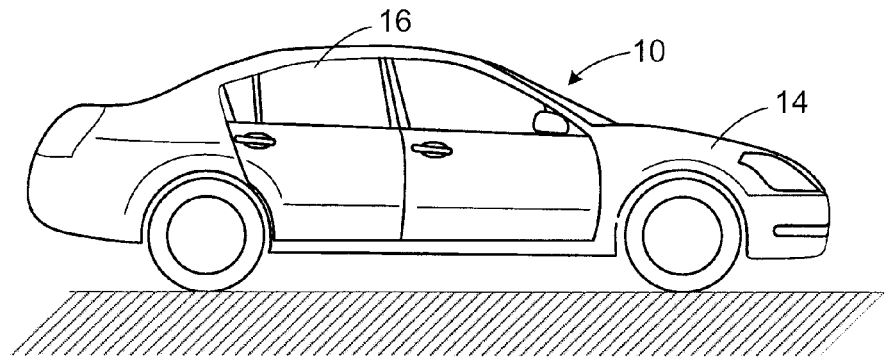
FIG. 1 is side view of a vehicle that includes an air conditioning system in accordance with the present invention.
Figure 2:
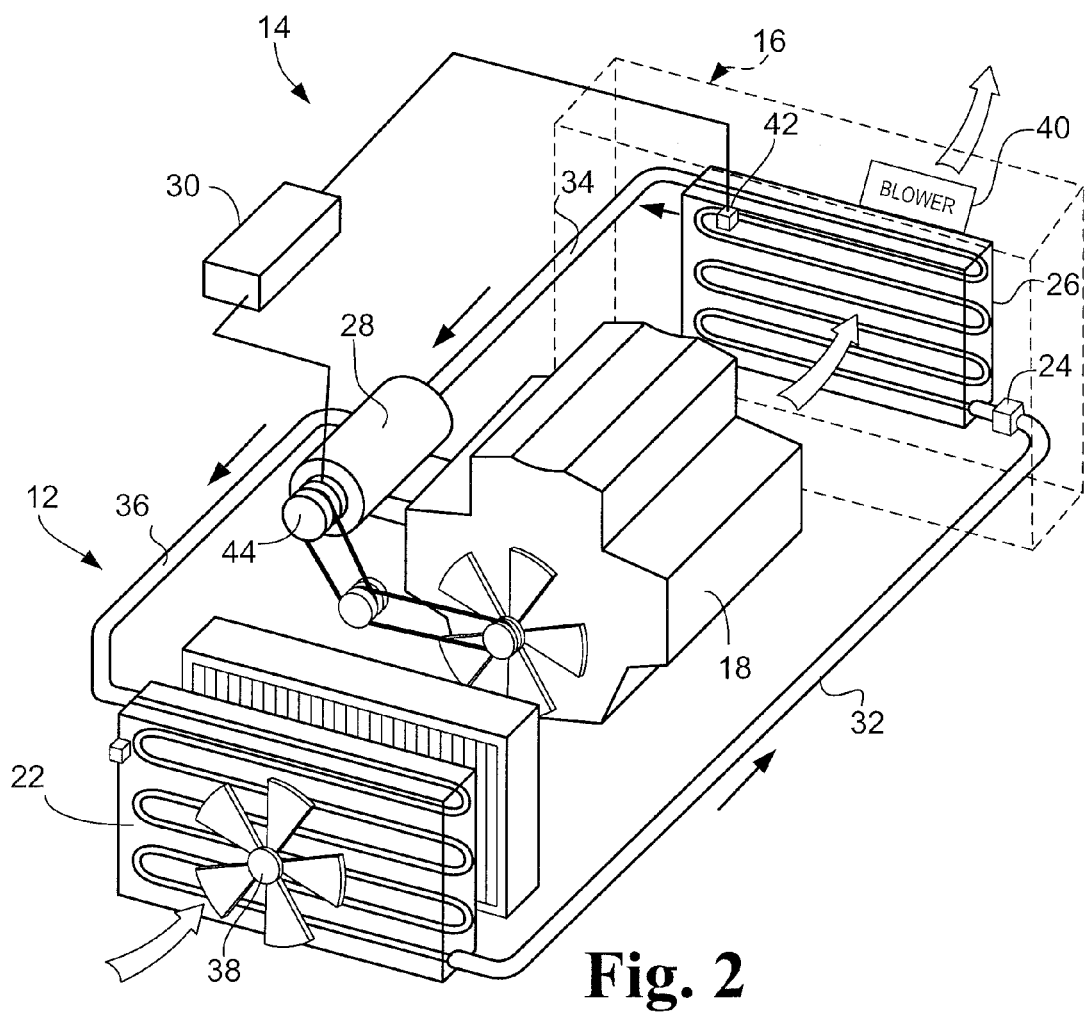
FIG. 2 is a perspective view of various vehicle components of the vehicle depicted in FIG. 1, including an engine and the air conditioning system, where the air conditioning system includes a controller, a compressor, an evaporator and a sensor at a low pressure section of the air conditioning system, the sensor providing signals to the controller representing measurements of changes of an operating condition at or within the low pressure section, in accordance with the present invention.

Referring initially to FIGS. 1 and 2, a vehicle 10 is illustrated that includes a vehicle air conditioning system 12 in accordance with a first embodiment of the present invention. The vehicle 10 includes an engine compartment 14, a passenger compartment or vehicle cabin 16 and an engine 18 (FIG. 2 only). The vehicle 10 also includes many conventional components, such as a drive train, a suspension assembly and a steering assembly as well as other conventional components. A description of these conventional components is omitted for the sake of brevity.

As best shown in FIG. 2, the vehicle air conditioning system 12 includes a condenser 22, a pressure reducing device 24, an evaporator 26, a compressor 28 and a controller 30. The condenser 22, the pressure reducing device 24, the evaporator 26 and the compressor 28 are conventional components that are well known in the air conditioning field. Since these components are well known, the precise construction of these components will not be discussed in detail for the sake of brevity. Although not shown, the vehicle 10 also includes a battery that provides electrical power to the controller 30 and various other components within the vehicle 10.

The condenser 22 is in fluid communication with the pressure reducing device 24 via a high pressure refrigerant line 32. The pressure reducing device 24 is preferably installed to or adjacent to the evaporator 26 and is in fluid communication with the evaporator 26. The evaporator 26 is in fluid communication with the compressor 28 via a low pressure refrigerant line 34. The compressor 28 is in fluid communication with the condenser 22 via a high pressure refrigerant line 36. The refrigerant lines 32, 34 and 36 are conventional air conditioning elements.

The air conditioning system 12 can be characterized as a two part system. Specifically, the air conditioning system 12 includes a high pressure section and a low pressure section. The high pressure section of the air conditioning system 12 includes an outlet side of the compressor 28, the high pressure refrigerant line 36, the condenser 22, the high pressure refrigerant line 36 and an inlet side of the pressure reducing device 24. The low pressure section of the air conditioning system 12 includes an outlet side of the pressure reducing device 24, the evaporator 26, the low pressure refrigerant line 36 and the inlet side of the compressor 28.

The condenser 22 can optionally include a condenser fan 38 that can automatically cycles on and off in a conventional manner in order to dissipate heat generated by the compressed refrigerant flowing through the condenser 22. For example, the condenser fan 38 can be controlled by feedback from a temperature sensor or pressure sensor (not shown) disposed within the condenser, on the condenser 22 or downstream from air flowing past coils of the condenser 22. When the condenser 22 reaches a predetermined threshold temperature or predetermined threshold pressure, the condenser fan 38 is turned on to assist in the dissipation of heat in a conventional manner.

The pressure reducing device 24 can be any of a variety of expansion devices. For example, the pressure reducing device 24 can be an orifice tube, an expansion valve or any other conventional air conditioning device that controls the release or expansion of high pressure compressed refrigerant from the condenser 22 into the evaporator 26, such that refrigerant pressure within the evaporator 26 is maintained at a level that provides appropriate cooling for the air conditioning system 12.

The evaporator 26 has associated with it a blower 40 and a sensor 42. The blower 42 is dimensioned and positioned to push or draw air around coils of the evaporator 26 such that the flowing air is cooled by the evaporator 26. The air flowing around the coils of the evaporator 26 is preferably directed by ducts (not shown) into appropriate areas of vehicle cabin 16. The evaporator 26 is indicated in FIG. 2 as being located within the vehicle cabin 16. However, the evaporator 26 can alternatively be located within the engine compartment 14 within duct work that directs air flow around coils of the evaporator 26 and into the vehicle cabin 16.

The blower fan 40 is preferably controlled by the vehicle driver or passengers. Operator controls (and/or passenger controls) of the air conditioning system 12 are preferably located in the vehicle cabin 16. For example, the operator controls typically will include an AC ON/OFF switch, a temperature control and a blower or fan speed control located on a dashboard (not shown) within the vehicle cabin 16 of the vehicle 10. Once the operator turns on the blower fan 40, the blower fan 40 begins to blow air into the vehicle cabin 16.

The operator controls (not shown) of the air conditioning system 12 are also configured to activate and adjust the output of the air conditioning system 12. Specifically, when a passenger turns the air conditioning system 12 on and adjusts the operator controls to request cooling in the vehicle cabin 16, the controller 30 is configured and/or programmed to control operation of the compressor 28. With the request for cooling, the controller 30 cycles the compressor 28 on and off in response to an operating condition(s) detected by the sensor 42, as is also described in greater detail below.

Optionally, the operator controls can include cooling mode selecting controls, that, for example, switch operation of the air conditioning system 12 between a normal operating mode, a MAX operating mode and an economy operating mode. For example, the normal operating mode can be designed to have the controller 30 operate the air conditioning system 12 in a default mode with a predetermined normal operating range. The MAX operating mode can be designed to have the controller 30 operate the air conditioning system 12 in a maximum cooling and/or drying mode with a predetermined maximized operating range. Specifically, the MAX operating mode can be designed specifically for rapidly drying out the air in the vehicle cabin 16 or rapidly defogging the windshield of the vehicle 10. Further, the economy operating mode can be designed to have the controller 30 operate the air conditioning system 12 in a manner that minimizes the energy demands made by the compressor 28 on the engine 18 using an economy operating range.

The sensor 42 is depicted schematically in FIG. 2 and can be located in any of a plurality of locations. The sensor 42 is in electronic communication with the controller 30 such that signals representing a measurement of the operating condition are transmitted from the sensor 42 directly to the controller 30 in real time.

The sensor 42 can be either a pressure sensor or a temperature sensor. Specifically, if the sensor 42 is a pressure sensor, the sensor 42 can measure the refrigerant pressure within the low pressure refrigerant line 34, the refrigerant pressure within the evaporator 26 and/or the refrigerant pressure at the outlet side of the pressure reducing device 24. More specifically, the sensor 42 can be installed to measure the refrigerant pressure at any appropriate location within the low pressure section of the air conditioning system 12.

If the sensor 42 is configured to measure refrigerant pressure, then the controller 30 can be configured to operate the compressor 28 within a prescribed operating range that is defined between a predetermined upper pressure threshold and a predetermined lower pressure threshold.

Alternatively, the sensor 42 can be a temperature sensor. For example, the sensor 42 can be positioned to measure the temperature of the refrigerant at any appropriate point within the low pressure section of the air conditioning system 12. Further, the sensor 42 can alternatively be located downstream of air that has flowed through the coils of the evaporator 26 to measure the temperature of the air that has passed through the coils of the evaporator 26, or, still further, the sensor 42 can be positioned to measure the temperature of the surface of the evaporator 26, or the temperature of refrigerant within the low pressure section of the air conditioning system.

If the sensor 42 is configured to measure temperature, the controller 30 can be configured to operate the compressor 28 within a prescribed operating range that is defined between a predetermined upper temperature threshold and a predetermined lower temperature threshold.

The above mentioned predetermined upper and lower pressure thresholds and predetermined upper and lower temperature threshold can be fixed values in some vehicle applications. Alternatively, the predetermined upper and lower pressure thresholds and predetermined upper and lower temperature threshold can be adjusted by the controller 30 in response to, for example, the vehicle operator switching between the normal operating mode, the MAX operating mode and the economy operating mode.

Ultimately, the sensor 42 is configured and arranged to measure an operating condition of the low pressure section of the air conditioning system 12. The operating condition can be any of the following: refrigerant pressure within the evaporator 26 or any appropriate location in the low pressure section of the air conditioning system 12; temperature on an outer surface the evaporator 26; refrigerant temperature at an appropriate location in the low pressure section of the air conditioning system 12; or air temperature downstream from the evaporator 26.

In FIG. 2, the sensor 42 is depicted as being on or within the evaporator 26. However, it should be understood from the drawings and the description herein that the sensor 42 can also be located at the outlet side of the pressure reducing device 24, within the evaporator 26, within the low pressure refrigerant line 34, on an outer surface of the evaporator 26 or downstream from the evaporator 26.

The compressor 28 is preferably powered by the engine 18 of the vehicle 10 in a conventional manner. Specifically, an endless belt extends between a pulley on the engine 18 and around a pulley of the compressor 28 in a conventional manner. The compressor 28 preferably includes a conventional electro/mechanical clutch 44 or other similar device that makes it possible to cycle the compressor 28 between an active state where refrigerant is compressed and an inactive state where the refrigerant is not being compressed. The active state of the compressor 28 is a state where the clutch 44 is engaged and the compressor 28 pumps refrigerant from the low pressure section of the air conditioning system 12, compresses the refrigerant and outputs the compressed refrigerant to the high pressure section of the air conditioning system 12. The inactive state of the compressor 28 is a state where the clutch 44 of the compressor 28 is dis-engaged and the compressor 28 is idle and thus does not compress or pump refrigerant.

When the compressor 28 is in the active state, the compressor 28 pumps or draws refrigerant from the low pressure section of the air conditioning system 12. Hence, when the compressor 28 is in the active state, the pressure of the refrigerant in the low pressure section of the air conditioning system 12 drops. Consequently, if the sensor 42 is a pressure sensor, a drop or reduction in pressure in the low pressure section of the air conditioning system 12 is an indication of compressor operation. When the compressor 28 is cycled to the inactive state, the pressure in the low pressure section of the air conditioning system 12 increases due to several factors, such as the pressure reducing device 24 continuing to release or expand compressed refrigerant from the high pressure section into the low pressure section of the air conditioning system 12, and heat absorbed by the evaporator 26 causing refrigerant within the evaporator 26 to expand thus increasing refrigerant pressure. Thus increases in refrigerant pressure measured by the sensor 42 provide an indication that the compressor 28 is in the inactive state.

Similarly, when the compressor 28 is in the active state compressing refrigerant, the temperature of the refrigerant in the low pressure section of the air conditioning system 12 decreases. Further, when the compressor 28 is in the active state, the temperature of the air passing around the coils of the evaporator 26 also decreases. Consequently, if the sensor 42 is a temperature sensor, a measured decrease in temperature in or at the low pressure section of the air conditioning system 12, indicates compressor operation in the active state.

When the compressor 28 is cycled to the inactive state, the temperature in the low pressure section of the air conditioning system 12 typically begins to increase due to several factors, such as the pressure reducing device 24 continuing to release or expand compressed refrigerant from the high pressure section into the low pressure section of the air conditioning system 12, and warm air passing around the coils of the evaporator 26 causing refrigerant within the evaporator 26 to heat up and expand. Hence, measured increases in temperature by the sensor 42 indicate that the compressor 28 is in the inactive state.

The above measured operating condition(s) (temperature and/or pressure) therefore provides an indication of the state (active or inactive) of compressor 28.

The measurements made by the sensor 42 are used by the controller 30 for at least two separate purposes. First, the operating condition(s) measured by the sensor 42 provides feedback for the controller 30 for control cycling of the compressor 28 between the active state and the inactive state. Second, the operating condition(s) measured by the sensor 42 provides the controller 30 with the means to determine time delays.

More specifically, the controller 42 determines time delays corresponding to a time occurring between the controller 30 initiating the switch from the one of the inactive and active states to the other of the compressor 28, and a detected change in the operating condition due to the compressor 28 switching from the one of the inactive and active states to the other of the inactive and active states.

The controller 30 is electronically connected to the clutch 44 of the compressor 28 and the sensor 42, as indicated in FIG. 2. During operation of the air conditioning system 12, the controller 30 determines that cooling is required in response to a vehicle passenger requesting cooling. In response, the controller 30 is configured and/or programmed to send an ON signal to the clutch 44 to engage, thus initiating a change in the status of the compressor 28 from the inactive state to the active state. Similarly, the controller 30 can send an OFF signal to the clutch 44 to disengage, thereby changing the status of the compressor 28 to the inactive state. In the air conditioning system 12, the change between the inactive and active states of the compressor 28 is not usually instantaneous. In the various embodiments of the present invention, the controller 30 determines such time delays and compensates for such time delays.

Figure 3:
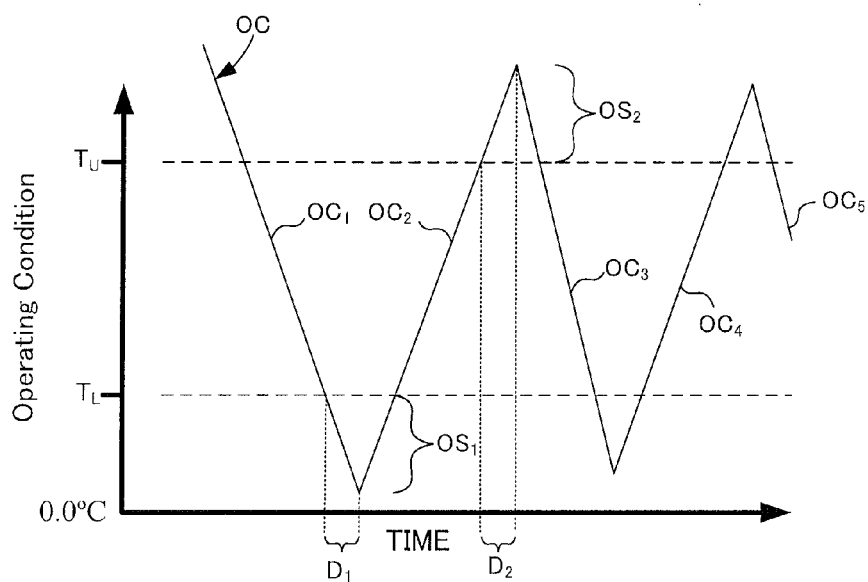
FIG. 3 is a chart representing the operating condition measured over time by the sensor of the air conditioning system, where the controller cycles the compressor between an active state and an inactive state in response to the compressor determining that the operating condition has a value that is equal to or surpasses upper and lower operating thresholds, the chart also so showing overshooting corresponding to time delays between the moment the controller attempts to change the state of the compressor and the moment the sensor measures and indication that the compressor has changed states, in accordance with the present invention.
Figure 4:
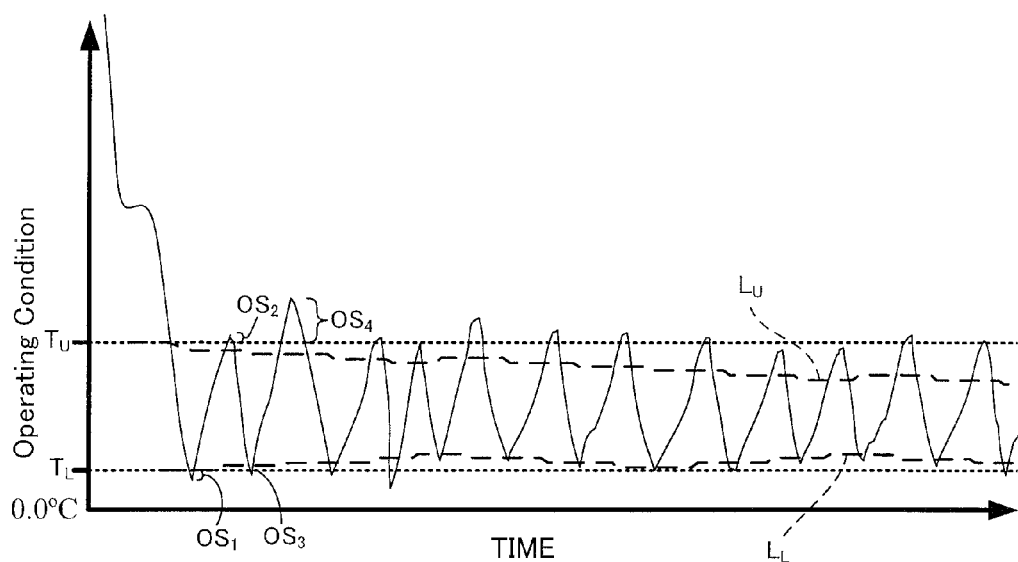
FIG. 4 is another chart of the operating condition measured over time by the sensor of the air conditioning system, showing calculated upper and lower limits that are used by the controller to cycle the compressor between the active and inactive states to compensate for detection of the time delays, in accordance with the present invention.

A brief overview of the present invention is provided now with specific reference to FIGS. 3 and 4.

FIG. 3 is a schematic graph that shows the measurements provided from the sensor 42 to the controller 30. Specifically, the solid line in FIG. 3 represents a measured operating condition OC. The operating condition OC can be either measured temperature or measured pressure at the low pressure section of the air conditioning system 12. Decreasing sections of the measured operating condition OC are the result of the compressor 28 compressing refrigerant. When the compressor 28 compresses refrigerant, both temperature and pressure at the low pressure section of the air conditioning system 12 decrease. Consequently, sections $OC_1$, $OC_3$ and $OC_5$ of the operating condition OC correspond to the compressor 28 being in the active state. Further, indications of increases of the measured operating condition OC correspond to the compressor 28 ceasing to compress refrigerant. When the compressor 28 ceases compressing refrigerant, both temperature and pressure at the low pressure section of the air conditioning system 12 increase. Consequently, as shown in FIG. 3, the sections $OC_2$ and $OC_4$ of the operating condition OC correspond to the compressor 28 being in the inactive state.

As is indicated in FIG. 3, operation of the compressor 28 by the controller 30 includes a predetermined upper threshold $T_U$ (a compressor activation threshold) and a predetermined lower threshold $T_L$ (a compressor deactivation threshold). More specifically, the upper threshold $T_U$ and the lower threshold $T_L$ define the operating range of the evaporator 26 and hence the operating range of the compressor 28.

In the first embodiment of the present invention described below, the lower threshold $T_L$ is a first fixed operation threshold and the upper threshold $T_U$ is a second fixed operation threshold. However, in the second, third and fourth embodiments, the upper threshold $T_U$ and the lower threshold $T_L$ can be adjusted. In other words, in the first embodiment, the operating range of the compressor 28 is a fixed operating range. In the second, third and fourth embodiments, the operating range of the compressor 28 can be adjusted, as described in greater detail below.

Both the upper threshold $T_U$ and the predetermined lower threshold $T_L$ are at least initially used by the controller 30 to control operation of the compressor 28 in each of the embodiments described below. More specifically, the controller 30 receives the continuously changing measurements made by the sensor 42 and compares the measurements of the sensor 42 with the lower threshold $T_L$ and the upper threshold $T_U$. Hence, the low pressure section of the air conditioning system 12 (including the evaporator 26) has a prescribed operating range bounded by the upper threshold $T_U$ and the lower threshold $T_L$, the upper threshold $T_U$ and the lower threshold $T_L$ constituting operation thresholds.

It should be understood from the drawings and the description that the upper threshold $T_U$ and the lower threshold $T_L$ vary from air conditioning system to air conditioning system. For example, in a vehicle, such as a passenger vehicle, where the operating condition OC is pressure, the upper threshold $T_U$ and the lower threshold $T_L$ can define a pressure range of between 30 psig and 50 psig when the refrigerant is R-134a or a similar refrigerant. However, the pressure range can vary depending upon the type of refrigerant used in the air conditioning system 12 and the overall requirements of the system. Therefore, the present invention is not limited to a pressure range of between 30 psig and 50 psig at the low pressure section.

Where the operating condition OC is temperature, the upper threshold $T_U$ and the lower threshold $T_L$ can define a temperature range of between 8° C. and 0° C., but may be narrowed in some vehicles to between about 4° C. and 1° C. However, it should be understood that this range varies from air conditioning system to air conditioning system.

When the air conditioning system 12 is initially turned on, the controller 30 is configured or programmed to operate the compressor 28 using default definitions of the lower threshold $T_L$ and the upper threshold $T_U$ as triggers to cycle the compressor 28 between the active state (clutch 44 engaged) and the inactive state (clutch 44 dis-engaged). These default values are determined on a system by system basis. More specifically, upon start up, the controller 30 defines a plurality of variables relative to the default values of the lower threshold $T_L$ and the upper threshold $T_U$, as described in greater detail below. The default values of the lower threshold $T_L$ and the upper threshold $T_U$ are preferably fixed values stored in memory within the controller 30.

More specifically, initially when the air conditioning system 12 is turned on (after having been off), the controller 30 sends a signal to the clutch 44 to change the compressor 28 from the inactive state to the active state. As indicated by the first section $OC_1$ of the operating condition OC in FIG. 3, the sensor 42 provides a measurement indicating that the operating condition OC is decreasing due to compressor 28 operation. When the sensor 42 provides a measurement that is equal to or lower than (surpassing) the lower threshold $T_L$, the controller 30 sends a signal to the clutch 44 to dis-engage.

As is shown near the bottom of the graph in FIG. 3, there can be a time delay $D_1$ between the moment the controller 30 sends a signal to dis-engage the clutch 44 (shortly after the sensor 42 measures the operating condition being equal to or lower than the lower threshold $T_L$), and the moment the sensor 42 measures that the compressor 28 has achieved the inactive state (the clutch 44 has disengaged).

Further, there can be a time delay $D_2$ between the moment the controller 30 sends a signal to engage the clutch 44 (shortly after the sensor 42 measures the operating condition being equal to or greater than or surpasses the upper threshold $T_U$), and the moment the sensor 42 measures that the compressor 28 has achieved the active state (the clutch 44 has engaged).

The time delays $D_1$ and $D_2$ can be caused by a variety of factors, such as, for example, mechanical inertial of the compressor 28 and its associated mechanisms, magnetic clutch 44 engagement delays (hysteresis effects of the electro magnet in the clutch 44), inertia and/or slippage of the clutch 44, relay action delays, computer communication delays, operating condition measurement delays, refrigerant flow factors (i.e., compressor/engine speed, expansion valve reaction time) the processing speed of the controller 30, and/or delayed changes in the refrigerant temperature or pressure due to refrigerant flow through the various portions of the air conditioning system 12. Other factors may also contribute to the time delays.

The time delays $D_1$ and $D_2$ can also vary depending upon atmospheric and/or weather conditions around the vehicle 10, the speed of the engine 18 (RPMs), speed of the vehicle 10, and/or temperature and/or moisture conditions within the vehicle cabin 16. In other words, the time delays $D_1$ and $D_2$ can be different every time the air conditioning system 12 is engaged and every time the compressor 28 is cycled between the active and inactive states. For example, the time delays $D_1$ and $D_2$ have different values from one another, as indicated in FIG. 3.

The consequence of the time delays (such as time delays $D_1$ and $D_2$ are indicated by the operating condition overshoots $OS_1$, $OS_2$, $OS_3$ and $OS_4$ in FIG. 4. Specifically, when time delays occur, the operating temperature surpasses the relevant threshold. For example, as shown in FIG. 4, operating condition overshoots $OS_1$ and $OS_3$ surpass (have a value lower than) the lower threshold $T_L$. Further, operating condition overshoots $OS_2$ and $OS_4$ surpass (have a value greater than) the upper threshold $T_U$.

Air condition A/C load demands are a result of weather conditions (temperature and humidity), system airflow (blower speed selection and potentially vehicle speed), the selection of re-circulated air or fresh air (which likely differ in temperature and humidity) for the system intake. In effect, the existence of a time delay has a different consequence depending on conditions. The time delays themselves, which vary in time duration, are difficult to completely eliminate. It is the consequence of the time delays that are largely controlled by the logic in the various embodiments of the present invention. For example, with very hot and humid inlet conditions, when the compressor cycles off, the evaporator temperature rises quickly and any time delay has a corresponding temperature consequence (i.e. sometimes as much as 5° C.). Conversely, in cool and perhaps low humidity conditions, the temperature rise can be very slow when the compressor deactivates and the delay may have an almost immeasurable consequence (i.e. 0.1° C.). The logic in the various embodiments of the present invention reacts to changes in the time delays and the air conditioning loading, in order to compensate for the time delays and minimize the consequences of the time delays.

In each of the following embodiments, the controller 30 is configured and/or programmed compensate for the time delays in the various manners described in greater detail below.

Upon start-up, the controller 30 initially defines an upper limit $L_U$ as being equal to the default value of the upper threshold $T_U$ and initially defines a lower limit $L_L$ as being equal to the default value of the lower threshold $T_L$, as indicated in FIG. 4. The controller 30 preferably uses the upper limit $L_U$ and the lower limit $L_L$ to determine the switch in status of the compressor 28 between the active state and the inactive state.

Once the controller 30 has cycled the compressor 30 between the active state and the inactive state, the controller 30 determines time delays and compensates for those time delays by re-calculating and/or adjusting the upper limit $L_U$ and the lower limit $L_L$, as described in greater detail below.

After an initial cycling of the compressor 28 between the active and inactive states, the controller 30 reduces its usage of the upper threshold $T_U$ and the lower threshold $T_L$ with respect to control cycling of the compressor 28. Instead, the controller 30 continuously determines the time delays, and re-evaluates the values of the upper limit $L_U$ and the lower limit $L_L$ to compensate for the detected time delays. Thereafter, the controller 30 relies on the upper limit $L_U$ and the lower limit $L_L$ to control cycling of the compressor 28.

In other words, initially the controller 30 controls cycling of the compressor 30 between the active state and the inactive state using the values of the upper threshold $T_U$ and the lower threshold $T_L$. Once the sensor 42 begins to measure the operation condition OC, such as sections $OC_1$ and $OC_2$, the controller 30 determines whether or not there is a time delay, such as the time delays $D_1$ and $D_2$. For all subsequent compressor cycles, the controller 30 compensates one or both of the lower limit $L_L$ and the upper limit $L_U$ with offsets to take the time delays $D_1$ and $D_2$ into account.

In response to the determination of the time delay $D_1$, the lower limit $L_L$ is redefined or modified by an offset, increasing or decreasing the value of the lower limit $L_L$. In subsequent cycles of the compressor 28 (until the air conditioning system 12 is turned off), the controller 30 primarily compares measurement of the operation condition OC with the lower limit $L_L$, for control of the compressor 28. The controller 30 only uses the lower threshold $T_L$ for control of the compressor 28 when the lower limit $L_L$ has been over adjusted. However, typically the value of the lower limit $L_L$ is greater in value than the lower threshold $T_L$. Therefore, the compressor 28 subsequently changes from the active state to the inactive state with the measured operating condition being closer to the value of the lower threshold $T_L$ than would occur without use of the lower limit $L_L$, as is indicated by the dashed line indicating the lower limit $L_L$ in FIG. 4.

Similarly, the controller 30 initially defines the upper limit $L_U$ as being equal to the upper threshold $T_U$. In response to the determination of the time delay $D_2$, the upper limit $L_U$ is redefined or modified by an offset, decreasing or increasing the value of the upper limit $L_U$. In all subsequent cycles of the compressor 28 operation (until the air conditioning system 12 is turned off), the controller 30 primarily compares measurement of the operation condition OC with the upper limit $L_U$. The controller 30 only uses the upper threshold $T_U$ for control of the compressor 28 when the upper limit $L_U$ has been over adjusted. Therefore, the compressor 28 subsequently changes from the inactive state to the active state with the measured operating condition being closer to the value of the upper threshold $T_U$ than would occur without use of the upper limit $L_U$, as is indicated by the dashed line indicating the upper limit $L_U$ in FIG. 4.

Thus, as can be observed by considering the dashed lines indicating the lower limit $L_L$ and the upper limit $L_U$ in FIG. 4, the controller 30 continuously re-evaluates the values of the lower limit $L_L$ and the upper limit $L_U$ in response to detection of the time delays, such as the time delays $D_1$, $D_2$, $D_3$ and $D_4$ shown in FIG. 4.

Using the basic strategy of continuously re-evaluating the lower limit $L_L$ to compensate for determined time delays, the controller 30 controls operation of compressor 28 by changing from the active state to the inactive state with the operating condition OC measurement of the sensor 42 being as close to the lower threshold $T_L$ than would likely otherwise occur. Similarly, using the basic strategy of continuously re-evaluating the upper limit $L_U$ to compensate for determined time delays, the controller 30 strives to have the compressor 28 change between the inactive state to the active state with the operating condition OC measurement of the sensor 42 being as close as possible to the upper threshold $T_U$ than would likely otherwise occur. Further, the setting of either the lower limit $L_L$ and/or the upper limit $L_U$ (a first limit) is performed so as to compensate for a time delay in order to have the actual change in the state of the compressor 28 occur at a time with the operating condition OC is closer to the corresponding threshold than the corresponding limit.

The controller 30 continuously adds or subtracts a small offset from the value of the lower limit $L_L$, and adds or subtracts a small offset from the value of the upper limit $L_U$ in response to increases and decreases in corresponding determined time delays.

It should be understood from the drawings and the description herein, that the time delays can vary depending upon many, many factors, such as, for example, changes in engine RPMs, changes in vehicle speed, changes in air conditioning demands, such as changes in humidity, and changes in weather conditions. Therefore, the controller 30 is configured and/or programmed continuously re-evaluated the value of the lower limit $L_L$ and the value of the upper limit $L_U$ in response to determined changes in corresponding time delays.

Figure 5:
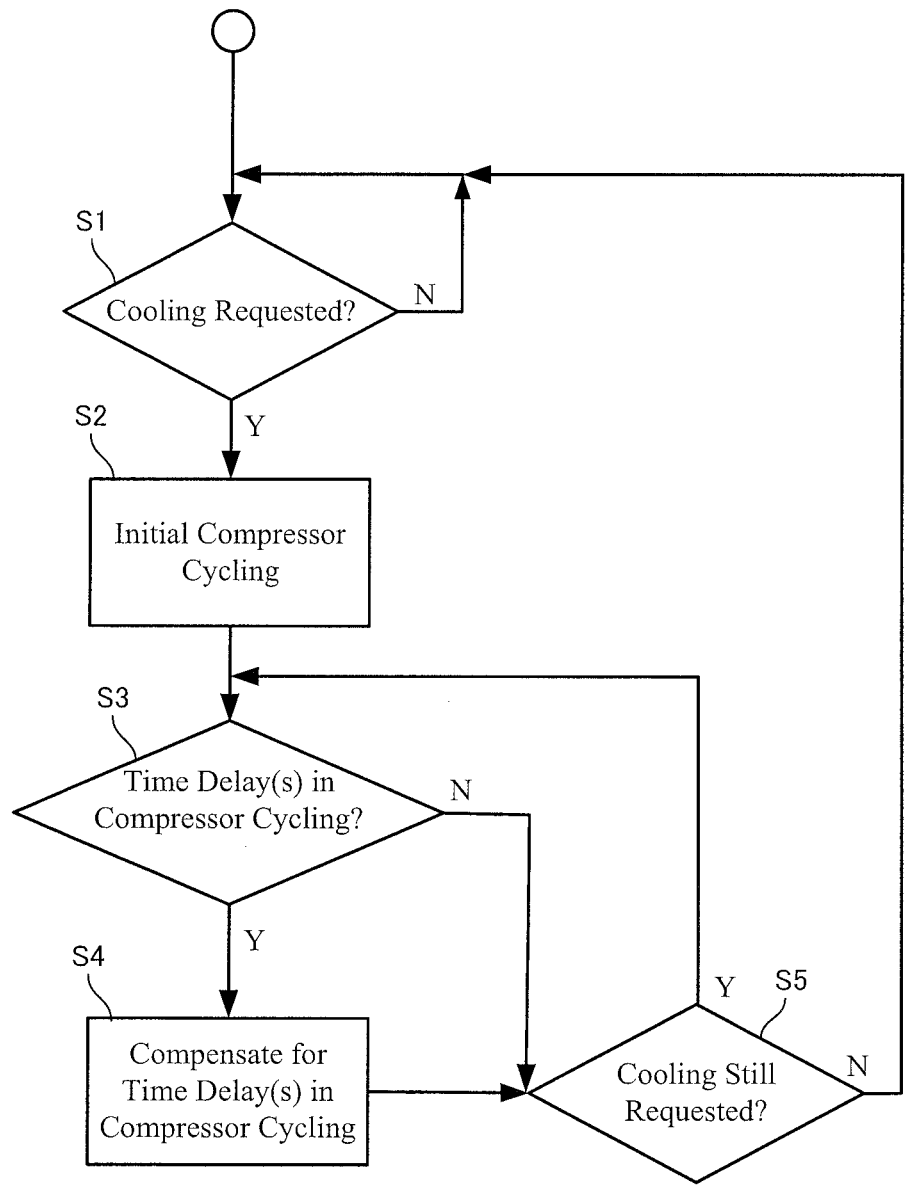
FIG. 5 is a flowchart showing basic steps for effecting control of the compressor of the air conditioning system in accordance with a first embodiment of the present invention.

FIG. 5 is a schematic flowchart showing the basic logic employed by the controller 30 for controlling the compressor 28 in accordance with a first embodiment of the present invention. Specifically, at step S1, the controller 30 determines whether or not the air conditioning system 12 has been turned on and cooling has been requested. If cooling has been requested at step S1, then operation moves to step S2. At step S2, the compressor 28 is cycled between the inactive state and active state at least one or more times.

At step S3, measurements made by the sensor 42 are evaluated to determine whether or not time delays are occurring between the moment a signal is sent by the controller 30 to the compressor 28 and the moment the sensor 42 detects change in the status or state of the compressor 28. If one or more time delays are detected, the operation moves to step S4. If no time delay is detected, then operation moves to step S5.

At step S4, one or both of the lower limit $L_L$ and the upper limit $L_U$ are re-calculated with an appropriate offset to compensate for the time delay(s). The offset(s) are added or subtracted as needed from one or both of the lower limit $L_L$ and the upper limit $L_U$. The adjustments to the lower limit $L_L$ and the upper limit $L_U$ are provided in order to have the compressor 28: change from the active state to the inactive state with the measured operating condition OC being as close as possible to the lower threshold $T_L$ as possible; and change from the inactive state to the active state with the measured operating condition OC being as close as possible to the upper threshold $T_U$ as possible. In other words, the adjustments to the lower limit $L_L$ and the upper limit $L_U$ are made repeatedly over each cycling of the compressor 28 to reduce and hopefully eliminate the consequence(s) of the time delay(s).

At step S5, the controller 30 determines whether or not cooling continues to be requested (the air conditioning system 12 is still on). At step S5, if cooling continues to be requested, operation returns to step S3. If cooling is no longer requested, operation returns to step S1.

Ideally, the compressor 28 should operate within the operating range (between the lower threshold $T_L$ and the upper threshold $T_U$). However, in real world, few air conditioning systems can operate perfectly within the operating range under all operating conditions. Therefore, by repeatedly adjusting the lower limit $L_L$ and the upper limit $L_U$ the compressor 28 operates in a range that is usually closer to the operating range (between the lower threshold $T_L$ and the upper threshold $T_U$) than without such adjustments to the lower limit $L_L$ and the upper limit $L_U$.

It should be understood from the drawings and the description herein that in the schematic representation of the first embodiment in FIG. 5, the operating condition OC can be either measured temperature or measured pressure measured at the low pressure section of the air conditioning system 12.

In the following alternate embodiments, temperature is measured as an example of the operating condition OC. However, it should be understood from the drawings and description herein that in each of the following examples and embodiments of the present invention, the operating condition OC can alternatively be measured as the pressure within any appropriate location of the low pressure section of the air conditioning system 12.

Second Embodiment

Referring now to the flowcharts in FIGS. 6, 7 and 8, various operational steps performed by the controller 30 to operate the compressor 28 in accordance with a second embodiment will now be explained. The components of the air conditioning system 12, as described above are not changed in the second embodiments. Rather, only the configuration and/or programming within the controller 30 is changed. Therefore, in view of the similarity between the first and second embodiments, the parts of the second embodiment that are identical to the parts of the first embodiment will be given the same reference numerals as the parts of the first embodiment.

In the second embodiment, the controller 30 is configured and/or programmed to operate the compressor 28 in response to changes in the operating condition OC, where the operating condition OC is temperature measured at the low pressure section of the air conditioning system 12, for example, on, in or proximate the evaporator 26. However, it should be understood from the drawings and the description herein that the basic logic represented in FIGS. 6-8 can alternatively be used with the sensor 42 measuring refrigerant pressure at the low pressure section of the air conditioning system 12.

Figure 6:
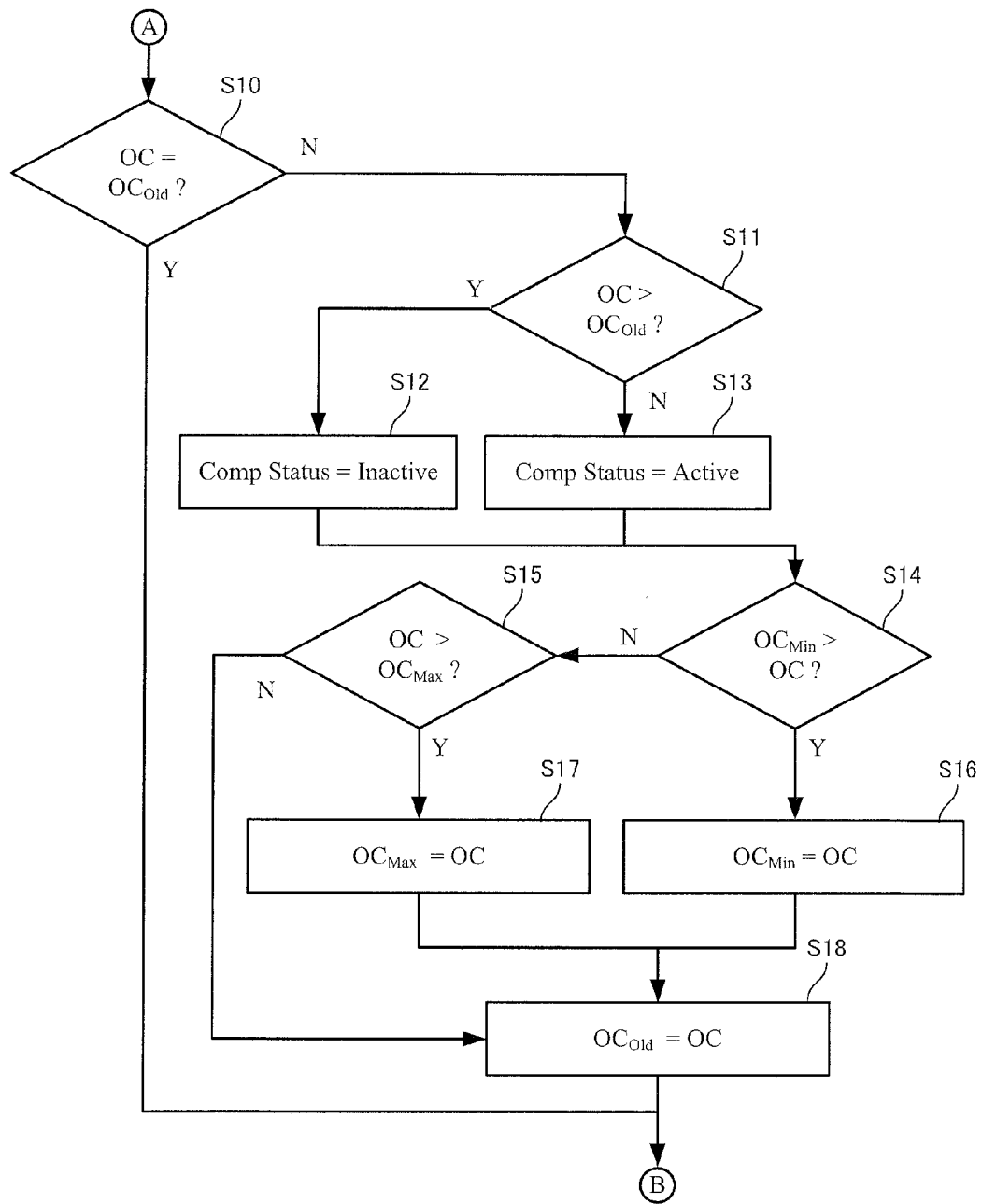
FIG. 6 is a first flowchart showing basic steps for effecting control of the air conditioning system, including evaluating the status or state of the compressor (active or inactive) and defining variables used in subsequent processing steps shown in FIGS. 7 and 8, in accordance with a second embodiment of the present invention.
Figure 7:
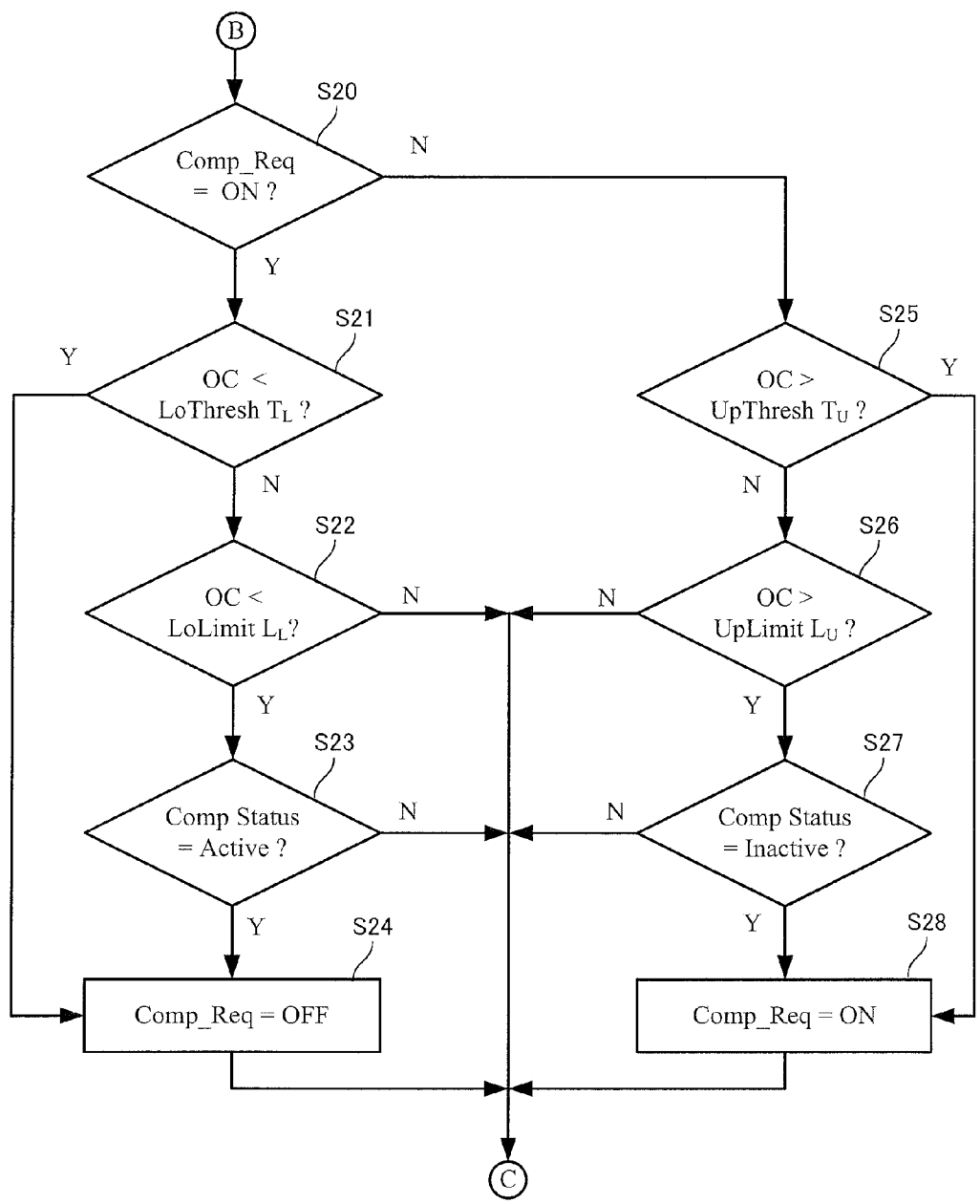
FIG. 7 is a second flowchart showing basic steps for effecting control of the air conditioning system, including sending signals or requests to the compressor to change the state of the compressor between the active state and the inactive state, in accordance with the second embodiment of the present invention.
Figure 8:
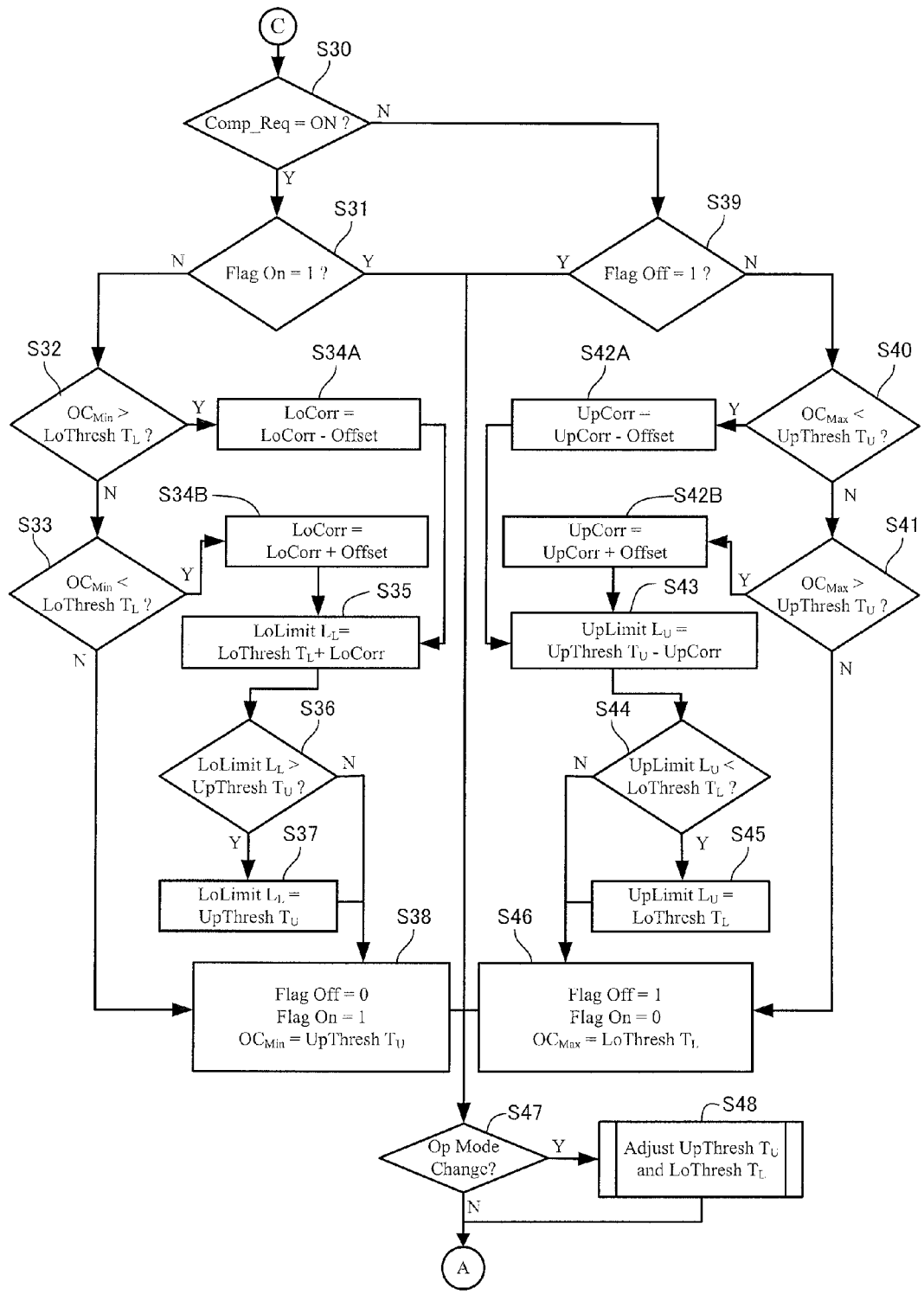
FIG. 8 is a third flowchart showing basic steps for effecting control of the air conditioning system, including determining whether or not changes should be made to the upper and lower limits to compensate for detection of time delays in compressor control, in accordance with the second embodiment of the present invention.

The controller 30 cycles through the various steps depicted in the flowcharts of FIGS. 6-8 on a continuing basis when the air conditioning system 12 is engaged (engine 18 running and blower fan 40 on). FIG. 6 depicts steps where information is gathered by the controller 30 concerning the changes in the operating condition OC measured by the sensor 42. Several variables are defined in FIG. 6 and subsequently used in the operations of the air conditioning system 12 depicted in FIGS. 7 and 8. More specifically, the variables defined in FIG. 6 assist in identifying the time delays discussed above.

FIG. 7 depicts further steps, includes steps performed by the controller 30 to initiate requests for the compressor 28 to switch between the active state (ON) and inactive state (OFF). Further, FIG. 7 depicts operational steps safeguard against over compensation with respect to adjustments made to the lower limit $L_L$ and/or the upper limit $L_U$. Ideally, the values of the lower limit $L_L$ and/or the upper limit $L_U$ should be confined between within the operating range defined by the lower threshold $T_L$ and the upper threshold $T_U$. However, if the values of the lower limit $L_L$ and/or the upper limit $L_U$ are adjusted to be outside the operating range, then the logic in the operational steps in FIG. 7 allows controller 30 to use the lower threshold $T_L$ and the upper threshold $T_U$, temporarily ignoring the lower limit $L_L$ and the upper limit $L_U$. Initially, the lower threshold $T_L$ and the upper threshold $T_U$ are defined using stored default values, but may subsequently be redefined, as described below with respect to the steps depicted at the bottom of FIG. 8. Further, the variable $OC_{Old}$ is defined as the operating condition OC at start-up.

FIG. 8 depicts operational steps that allow the controller 30 to re-evaluate and/or recalculate the values of each of the upper limit $L_U$ and the lower limit $L_L$ as needed to compensate for the above described time delays.

When the controller 30 is first provided with power (when the air conditioner system 12 is turned on by a passenger or driver of the vehicle 10—hereinafter referred to as startup), the controller initializes a group of variables that are discussed below. For instance, with respect to FIG. 6, upon startup, the controller 30 initially defines variable $OC_{Max}$ as being equal to the upper threshold $T_U$, and the variable $OC_{Min}$ is initially defined as being equal to the lower threshold $T_L$. The variables $OC_{Max}$ and $OC_{Min}$ are subsequently re-defined with each iteration of the operational steps depicted in FIGS. 6-8.

As indicated in FIG. 6 at step S10, the controller 30 compares a previously stored variable $OC_{Old}$ with the current measured operating condition OC. If the operating condition OC is equal to $OC_{Old}$, then operation cycles to the circle B at the bottom of FIG. 6, and on to the steps depicted in FIG. 7. If the operating condition OC is not equal to $OC_{Old}$, then operation moves to step S11.

At step S11, the controller 30 determines whether or not the operating condition OC is greater than $OC_{Old}$. Step S11 is a first step in a process that basically determines the direction of the change in the operating condition OC. If the operating condition OC is increasing compared to a previously stored value $OC_{Old}$, then the compressor 28 is in the inactive state. If the operating condition OC is decreasing compared to a previously stored value $OC_{Old}$, then the compressor 28 is in the active state and is compressing refrigerant. If the operating condition OC is greater than $OC_{Old}$ in step S11, then operations move to step S12. If the operating condition OC is not greater than $OC_{Old}$, then operations move to step S13.

At step S12, the controller 30 re-defines a variable Comp Status (compressor status) as being Inactive. Hence, at step S12, the variable Comp Status stores information indicating that the compressor 28 is in the inactive state. Conversely, at step S13, the controller 30 defines the variable Comp Status (compressor status) as being Active. Hence, at step S13, the variable Comp Status stores information confirming that the compressor 28 is in the active state. It should be understood that the variable Comp Status can store information such as, for example, a number that represents the status of the compressor 28, such as 1 to represent Inactive or a 0 to represent Active. However, for purposes of illustrating the present invention, the variable Comp Status is depicted as being either Active or Inactive.

Next, operations move to step S14. At step S14, the controller 30 determines if the variable $OC_{Min}$ is greater than the operating condition OC. If $OC_{Min}$ is not greater than the operating condition OC then operations move to step S15. If $OC_{Min}$ is greater than the operating condition OC then operations move to step S16.

At step S15, the controller 30 determines if the operating condition OC is greater than the variable $OC_{Max}$. If the operating condition OC is greater than $OC_{Max}$ then operations move to step S17. If the operating condition OC is not greater than $OC_{Max}$ then operations move to step S18.

At step S16, the variable $OC_{Min}$ is re-defined as being equal to the operating condition OC. At step S17, the variable $OC_{Max}$ is re-defined as being equal to the operating condition OC. The variables $OC_{Max}$ and $OC_{Min}$ are subsequently used in the operational steps shown in FIG. 8 in the process for compensating for the above described time delays. From either of steps S16 and S17, operation moves to step S18.

At step S18, the controller 30 defines (or re-defines) the variable $OC_{Old}$ as being equal to the operating condition OC such that the variable $OC_{Old}$ can be used in the next iteration of the steps in FIG. 6 to determine whether or not there are changes in the operating condition OC.

A description is now provided of the operational steps depicted in FIG. 7. As mentioned above, during air conditioning system operation, when cooling is requested by settings manipulated by a passenger or driver of the vehicle 10, the controller 30 sends a signal to the compressor 28 to change between the inactive state and the active state. When the controller 30 requests that the compressor 28 change to the active state, a variable Comp_Req is defined as ON. When the controller 30 requests that the compressor 28 change to the inactive state, the variable Comp_Req is defined as OFF. However, as will be better understood from the description below, the variable Comp_Req is only an indication of the currently stored instructions sent from the controller 30 with respect to control of the compressor 28. The variable Comp_Req is not an indication of the actual status of the compressor 28 (active state or inactive state), but rather is an indication of what the controller 30 has requested from the compressor 28 at that moment in time.

Referring now to FIG. 7, at step S20, the controller 30 determines whether or not variable Comp_Req is equal to ON. In other words, the controller 30 checks the last instruction sent to the compressor 28, i.e., has the controller 30 requested that the compressor 28 operate in the active state or not.

At step S20, if Comp_Req is equal to ON, then operations move to step S21. Hence, if Comp_Req is equal to ON, then the controller 30 has previously sent a signal to the compressor 28 to operate in the active state to compress refrigerant.

At step S20, if Comp_Req is not equal to ON, then operations move to step S25 (described below).

At S21, the controller 30 determines whether or not the operating condition OC is less than the lower threshold $T_L$. If operating condition OC is not less than the lower threshold $T_L$, then operations move to step S22. If the operating condition OC is not less than the lower threshold $T_L$ in step S21, then further cooling is required.

In step S21, if operating condition OC is less than (surpasses) the lower threshold $T_L$, then operations move to step S24 (described below). The determination that the operating condition OC is less than the lower threshold $T_L$ indicates that the operating condition has surpassed the lower threshold $T_L$ and the state of the compressor 28 should be changed to the inactive state (see step S24).

At step S22, the controller 30 determines whether or not the operating condition OC is less than the lower limit $L_L$. If operating condition OC is not less than the lower limit $L_L$, then operations move to the end of the flowchart indicated by the circle C, and the flowchart cycles to the flowchart depicted in FIG. 8.

If operating condition OC is not less than the lower limit $L_L$ in step S22 then further cooling is required and the compressor 28 should remain in the active state (the request for the compressor 28 to change to the active state should remain in effect).

At step S22, if operating condition OC is less than the lower limit $L_L$, then the operating condition OC has surpassed the lower limit $L_L$, meaning the state of the compressor 28 should be changed to the inactive state, and operations move to step S23.

In step S23, a determination is made with respect to the Comp Status (compressor 28 status) as defined in one of steps S12 and S13 in the flowchart of FIG. 6. Specifically, in step S23, if the Comp Status equals Active, then operations move to step S24. In step S23 if Comp Status does not equal Active (for example, if Comp Status=Inactive), then operations go to the end of the flowchart indicated by the circle C and on to FIG. 8.

At step S24, Comp_Req is set equal to OFF and a signal is sent to the clutch 44 of the compressor 28 to change the compressor 28 from the active state to the inactive state. Operations move to the end of the flowchart to the circle C, and the flowchart cycles to FIG. 8.

At step S25, the controller 30 determines whether or not whether or not the operating condition OC is greater than the upper threshold $T_U$. If the operating condition OC is greater than the upper threshold $T_U$, then operations move to step S28 (described below). If the operating condition OC is not greater than the upper threshold $T_U$, then operations move to step S26.

At step S26, a determination is made whether or not the operating condition OC is greater than the upper limit $L_U$. If the operating condition OC is greater (surpasses) than the upper limit $L_U$, then operations moves to step S27. If the operating condition OC is not greater than the upper limit $L_U$, then operations move to the end of the flowchart to the circle C, and to the flowchart in FIG. 8.

As step S27, the controller determines whether or not the Comp Status is equal to OFF (compressor 28 status is equal to Inactive or inactive state), as defined in one of steps S12 and S13 in the flowchart of FIG. 6. If the Comp Status is equal to Inactive, then operations move to step S28. If the Comp Status is not equal to Inactive, then the compressor 28 is in the active state and operations move to the end of the flowchart to the circle C, and the flowchart cycles to the flowchart in FIG. 8.

As step S28, Comp_Req is set equal to ON and a signal is sent to the clutch 44 of the compressor 28 to change the compressor 28 from the inactive state to the active state. Operations move to the end of the flowchart to the circle C, and the flowchart cycles to the flowchart in FIG. 8.

In the logic presented in the operational steps of FIG. 7, the operational steps depicted effect the change of the compressor 28 between the active state and the inactive state. Specifically, in step S24 the controller 30 sends a signal to the compressor 28 to change from the active state to the inactive state (from ON to OFF). Similarly, in step S28 the controller 30 sends a signal to the compressor 28 to change from the inactive state to the active state (from OFF to ON).

Further, the logic in steps S21 and S25 ensures that the operating range (between the upper threshold $T_U$ and the lower threshold $T_L$) of the compressor 28 is maintained, regardless of adjustments made to the upper limit $L_U$ and the lower limit $L_L$.

The "Comp Status" inspection logic at steps S23 and S27 enables the value of $L_L$ to be greater than $L_U$ in some circumstances, as may be required. For example, this logic can call for compressor deactivation at a relatively high temperature, but the response time delay will result in a low temperature which must rise to reach an upper limit. Conventional hysteresis approaches mandate that the activation level be greater than the deactivation level (always "ON" above the upper limit and always "OFF" below the lower limit). Without that requirement, it would be possible to meet conditions that demand activation and deactivation concurrently.

Referring now to FIG. 8, the controller 30 performs the various steps depicted in the flowchart in order to repeatedly re-evaluate and/or adjust the upper limit $L_U$ and the lower limit $L_L$. Upon startup of the air conditioning system 12, the controller 30 defines two variables Flag On and Flag Off. Initially, the variables Flag On and Flag Off are both made equal to 0 indicating that the compressor 28 has not cycled at all between the active state and the inactive state since startup. The variables Flag On and Flag Off are used in the logic shown in the flowchart in FIG. 8 to control subsequent re-evaluations of the upper limit $L_U$ and the lower limit $L_L$, as described below.

As shown in FIG. 8, at step S30, the controller 30 determines whether or not Comp_Req (from FIG. 7) is equal to ON or not. If Comp_Req is not equal to ON, then operations move to step S39. If Comp_Req is equal to ON in step S30, then operation moves to step S31.

At step S31, the controller determines whether or not Flag On is equal to one (1) or not. If the variable Flag On is equal to one (1), then operations move to step S47. If the variable Flag On is equal to one (1), then the compressor 28 has most recently cycled from the inactive state and the active state.

If Flag On is not equal to one (1), then operations move to step S32. At step S32, the controller 30 determines whether or not $OC_{Min}$ (from FIG. 6) is greater than the lower threshold $T_L$. If $OC_{Min}$ is greater than the lower threshold $T_L$, then operation moves to step S34A. If $OC_{Min}$ is not greater than the lower threshold $T_L$, then operation moves to step S33.

At step S33, the controller 30 determines whether or not $OC_{Min}$ (from FIG. 6) is less than the lower threshold $T_L$. If $OC_{Min}$ is less than the lower threshold $T_L$, then operation moves to step S34B. If $OC_{Min}$ is not less than the lower threshold $T_L$, then operation moves to step S38.

At step S34A, a variable LoCorr is made equal to a previous LoCorr minus an Offset. Initially, the variable LoCorr is made equal to zero on start up. However, with each iteration of the flowcharts depicted in FIGS. 6, 7 and 8, the variable LoCorr is repeatedly redefined. The variable LoCorr is basically a holding variable that accumulates the adjustments (the Offset) that are made to the lower limit $L_L$ to compensate for time delays. A further explanation of the usefulness of the variable LoCorr is proved below with respect to steps S47 and S48. After step S34A, operation moves to step S35.

The Offset used in steps S34A, S34B, S42A and S42B can be the same in each step, or can be predetermined as being different in each step. In the depicted embodiment, the Offset has the same value in all the steps S34A, S34B, S42A and S42B. Specifically, when operating condition OC measured by the sensor 42 is temperature, the offset is a temperature related offset, such as 0.5° C. However, it should be understood from the drawings and the description herein that the Offset can be set anywhere within a range of degrees. For example, the Offset can have a value of anywhere between 0.01° C. and 1.0° C., depending upon, for example, the computational speed of the controller 30, the capacity of the air conditioning system 12 and/or the robustness desired from a system that includes a time delay compensation. More preferably, the Offset can have a value of anywhere between 0.1° C. and 0.5° C.

If the operating condition OC measured by the sensor 42 is pressure, the Offset can be 5 psig or less, and preferably is at least 1 psig.

At step S34B, the variable LoCorr is again utilize, but is made equal to LoCorr plus the Offset. After step S34B, operation moves to step S35.

At step S35, the lower limit $L_L$ is made equal to the lower threshold $T_L$ plus the variable LoCorr. The variable LoCorr includes the value of the Offset to compensate for time delay(s). Step S35 ensures that adjustments made to the lower limit $L_L$ are made relative to the lower threshold $T_L$. Thereafter, operation moves to step S36.

At step S36, the controller 30 compares the lower limit $L_L$ with the upper threshold $T_U$. If the lower limit $L_L$ is not greater than the upper threshold $T_U$, then operation moves to step S38. If the lower limit $L_L$ is greater than the upper threshold $T_U$, then operation moves to step S37.

At step S37, the lower limit $L_L$ is re-defined as being equal to the upper threshold $T_U$. By redefining the lower limit $L_L$ is re-defined as being equal to the upper threshold $T_U$, the controller 30 ensures that the lower limit $L_L$ never exceeds the upper threshold $T_U$.

Finally, at step S38, the controller 30 defines Flag Off as equal to zero, Flag On as being equal to one (1) and $OC_{Min}$ as being equal to the upper threshold $T_U$. Thereafter, operation moves to step S47. It should be understood that variables defined at step S38 are being reset for the next iteration of the logic in FIGS. 6, 7 and 8.

At step S39, the controller determines whether or not Flag Off is equal to one (1) or not. If the variable Flag Off is equal to one (1), then operations move to step S47. If the variable Flag Off is equal to one (1), then the compressor 28 has most recently cycled from the active state and the inactive state.

If Flag Off is not equal to one (1), then operations move to step S40. At step S40, the controller 30 determines whether or not $OC_{Max}$ (from FIG. 6) is less than the upper threshold $T_U$. If $OC_{Max}$ is less than the upper threshold $T_U$, then operation moves to step S42A. If $OC_{Max}$ is not less than the upper threshold $T_U$, then operation moves to step S41.

At step S41, the controller 30 determines whether or not $OC_{Max}$ (from FIG. 6) is greater than the upper threshold $T_U$. If $OC_{Max}$ is not greater than the upper threshold $T_U$, then operation moves to step S46. If $OC_{Max}$ is greater than the upper threshold $T_U$, then operation moves to step S42B.

At step S42A, a variable UpCorr is made equal to a previous UpCorr minus the Offset. The variable UpCorr is initially defined by the controller 30 at startup as being equal to zero. However, the variable UpCorr can subsequently be redefined. Thereafter, operation moves to step S43.

Similarly, at step S42B, the variable UpCorr is again utilized, but is made equal to the previous value of UpCorr plus the Offset.

At step S43, the upper limit $L_U$ is made equal to the value of the upper threshold $T_U$ minus the variable UpCorr. The variable UpCorr includes the value of the Offset to compensate for time delay(s). Step S43 ensures that changes to the upper limit $L_U$ are made relative to the value of the upper threshold $T_U$. Thereafter, operation moves to step S44.

At step S44, the controller 30 compares the upper limit $L_U$ with the lower threshold $T_L$. If the upper limit $L_U$ is not less than the lower threshold $T_L$, then operation moves to step S46. If the upper limit $L_U$ is less than the lower threshold $T_L$, then operation moves to step S45.

At step S45, the upper limit $L_U$ is re-defined as being equal to the lower threshold $T_L$.

At step S46, the controller 30 defines Flag Off as equal to one, Flag On as being equal to zero and $OC_{Max}$ as being equal to the lower threshold $T_L$. Thereafter, operation moves to step S47. It should be understood that variables defined at step S46 are being reset for the next iteration of the logic in FIGS. 6, 7 and 8.

At step S47, the controller 30 determines whether or not a change has been made to the operating range of the air conditioning system 12. If the operating range has been changed, then at step S48 the upper threshold $T_U$ and the lower threshold $T_L$ are re-defined and operation moves to the circle A and back to FIG. 6. If no change has been made to the operating range, then operation moves to the circle A and back to FIG. 6.

The actions represented by steps S47 and S48 are optional. The air conditioning system 12 can optionally exclude these features. However, in the depicted embodiment, steps S47 and S48 are included.

As indicated by the operation at step S47, the controller 30 can be configured or programmed to operate in any of a plurality of different modes. For example, the air conditioning system 12 can operate in: the normal operating mode; the MAX operating mode; or the economy operating mode. Further, the air conditioning system 12 can optionally operate in other modes, such as that disclosed in U.S. Pat. No. 7,165,411, issued Jan. 23, 2007 and U.S. patent application Ser. No. 12/189,507, filed Aug. 11, 2008.

U.S. Pat. No. 7,165,411, issued Jan. 23, 2007, commonly assigned with the instant application, discloses an air conditioning system operated within a temperature operating range where at least one of an upper temperature threshold and a lower temperature threshold are adjusted in order to reduce the thermal effects on the engine resulting from air conditioner usage. U.S. Pat. No. 7,165,411 is incorporated herein by reference in its entirety.

U.S. patent application Ser. No. 12/189,507, filed Aug. 11, 2008, commonly assigned with the instant application, discloses an air conditioning system that is operated in an operating range where an upper threshold and a lower threshold are repeatedly re-evaluated or re-calculated based upon humidity content and are therefore not fixed temperatures or fixed pressures of the low pressure section of the air conditioning system. U.S. patent application Ser. No. 12/189,507 is incorporated herein by reference in its entirety.

Returning to step S47, the controller 30 is configured or programmed to change the operating range of the air conditioning system 12 in response to changes in the operating mode of the air conditioning system 12.

As mentioned above, the operating range of the compressor 28 and the evaporator 26 is defined by the upper threshold $T_U$ and the lower threshold $T_L$.

In the normal operating mode, the upper threshold $T_U$ and the lower threshold $T_L$ are preferably defined by the controller 30 as the default values stored in semi-permanent memory (such as EPROMs) and used at startup. Therefore, at step S47, if the operating range has changed from another mode to the normal operating mode, at step S48 the controller 30 redefines the upper threshold $T_U$ and the lower threshold $T_L$ as being equal to the default settings.

In the MAX operating mode, the upper threshold $T_U$ and the lower threshold $T_L$ can be redefined with values lower than the default values by the controller 30 in order to maximize the cooling operations of the air conditioning system 12. Therefore, at step S47, if the operating range has changed from another mode to the MAX operating mode, at step S48 the controller 30 redefines the upper threshold $T_U$ and the lower threshold $T_L$ as being equal to predefined MAX settings.

In the economy operating mode, the upper threshold $T_U$ and the lower threshold $T_L$ can be redefined with values slightly higher than the default values by the controller 30 in order to minimize the cooling operations of the air conditioning system 12. Therefore, at step S47, if the operating range has changed from another mode to the economy operating mode, at step S48 the controller 30 redefines the upper threshold $T_U$ and the lower threshold $T_L$ as being equal to predefined economy settings.

In either of the modes of operation disclosed in U.S. Pat. No. 7,165,411, issued Jan. 23, 2007 and U.S. patent application Ser. No. 12/189,507, filed Aug. 11, 2008, the controller 30 can redefine the upper threshold $T_U$ and the lower threshold $T_L$ in accordance with the logic disclosed in the commonly assigned patent documents. Therefore, at step S47, if the operating range has changed from another mode to the one of the operating modes in the commonly assigned patent documents, at step S48 the controller 30 redefines the upper threshold $T_U$ and the lower threshold $T_L$ accordingly.

Thus, in each subsequent iteration of the logic in FIGS. 6, 7 and 8, at step S35 the lower limit $L_L$ is adjusted with the variable LoCorr which includes the current cumulative Offset. Further, the lower limit $L_L$ is adjusted relative to the current value of the lower threshold $T_L$. As well, at step S43 the upper limit $L_U$ is adjusted with the variable UpCorr which includes the current Offset. Further, the upper limit $L_U$ is adjusted relative to the current value of the upper threshold $T_U$.

Using the above described logic, both the upper limit $L_U$ and the lower limit $L_L$ can be repeatedly re-evaluate and re-calculate in order to compensate for detected time delays.

Third Embodiment

Referring now to the flowcharts in FIGS. 9, 10, 11 and 12, various operational steps performed by the controller 30 to operate the compressor 28 in accordance with a third embodiment will now be explained. The components of the air conditioning system 12, as described above are not changed in the third embodiments. Only the configuration and/or programming of the controller 30 is changed. Therefore, in view of the similarity between the first and third embodiments, the parts of the third embodiment that are identical to the parts of the first embodiment will be given the same reference numerals as the parts of the first embodiment.

In the third embodiment, the controller 30 is configured and/or programmed to operate the compressor 28 in response to changes in the operating condition OC, where the operating condition OC is temperature measured at the low pressure section of the air conditioning system 12, for example, on, in or proximate the evaporator 26. However, it should be understood from the drawings and the description herein that the basic logic represented in FIGS. 9-12 can alternatively be used with the sensor 42 measuring refrigerant pressure at the low pressure section of the air conditioning system 12.

Figure 9:
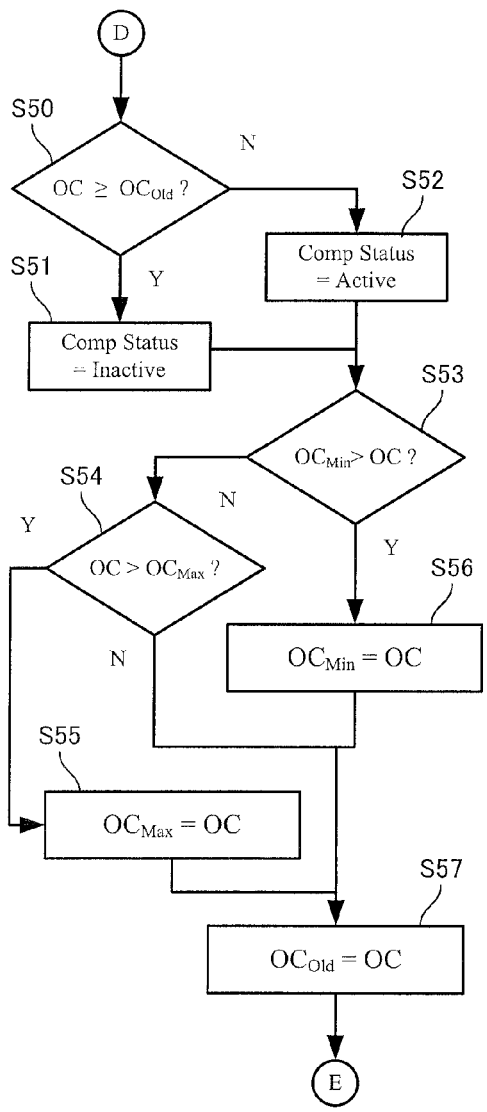
FIG. 9 is a fourth flowchart showing basic steps for effecting control of the air conditioning system, including evaluating the status or state of the compressor (active or inactive) and defining variables used in subsequent processing steps shown in FIGS. 9-12, in accordance with a third embodiment of the present invention.

In the third embodiment, FIG. 9 depicts operational steps that show logic for collecting information regarding the operation condition and variables used in subsequent logic are defined (and re-defined).

Figure 10:
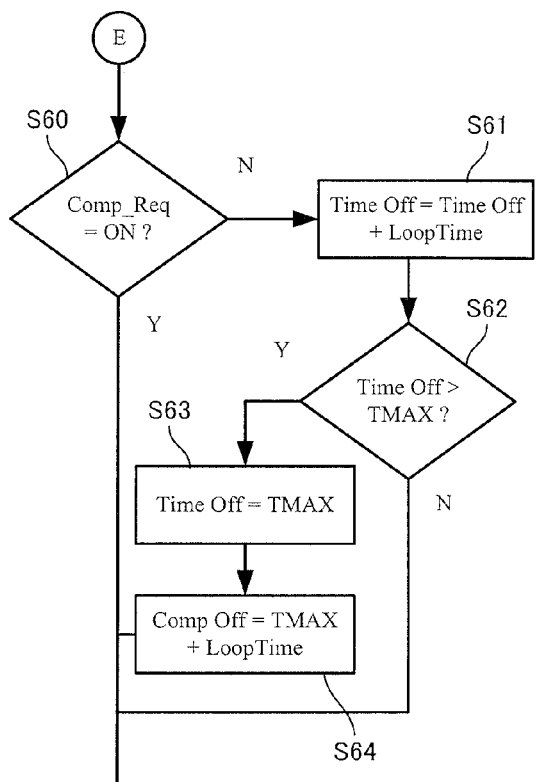
FIG. 10 is a fifth flowchart showing basis steps for determining how long the compressor is in the inactive state when cycling between the active state and the inactive state in accordance with the third embodiment of the present invention.

In FIG. 10, logic for a timing sequence is depicted where time delays are determined in terms of clocked time that the compressor 28 is in the inactive state. In FIG. 10, a fixed variable $T_{MAX}$ is predetermined based upon the overall design of the air conditioning system 12 and anticipated requirements of the air conditioning system 12. The fixed variable $T_{MAX}$ represents a preferred maximum amount of time that the compressor 28 should be allowed to remain in the inactive state with the air conditioning system 12 operating and cooling is requested. Also, a fixed variable DLIMIT represents a preferred minimum amount of time that the compressor 28 should be allowed to remain in the inactive state with the air conditioning system 12 operating and cooling is requested.

In FIG. 10, the time between iterations of the logic in FIGS. 9-12 is measured via the variable Loop Time. Loop Time is linked directly to an internal clock within the controller 30 and measures the time between iterations of the logic in FIGS. 9-12. Consequently, each time the logic cycles through FIGS. 9-12, Loop Time is used like a stop watch, resetting to zero with each iteration of the logic in FIGS. 9-12. Consequently, a variable Time Off (see step S61, below) is increased with each iteration until the variable Time Off exceeds the fixed variable $T_{MAX}$, as described in greater detail below.

Figure 11:
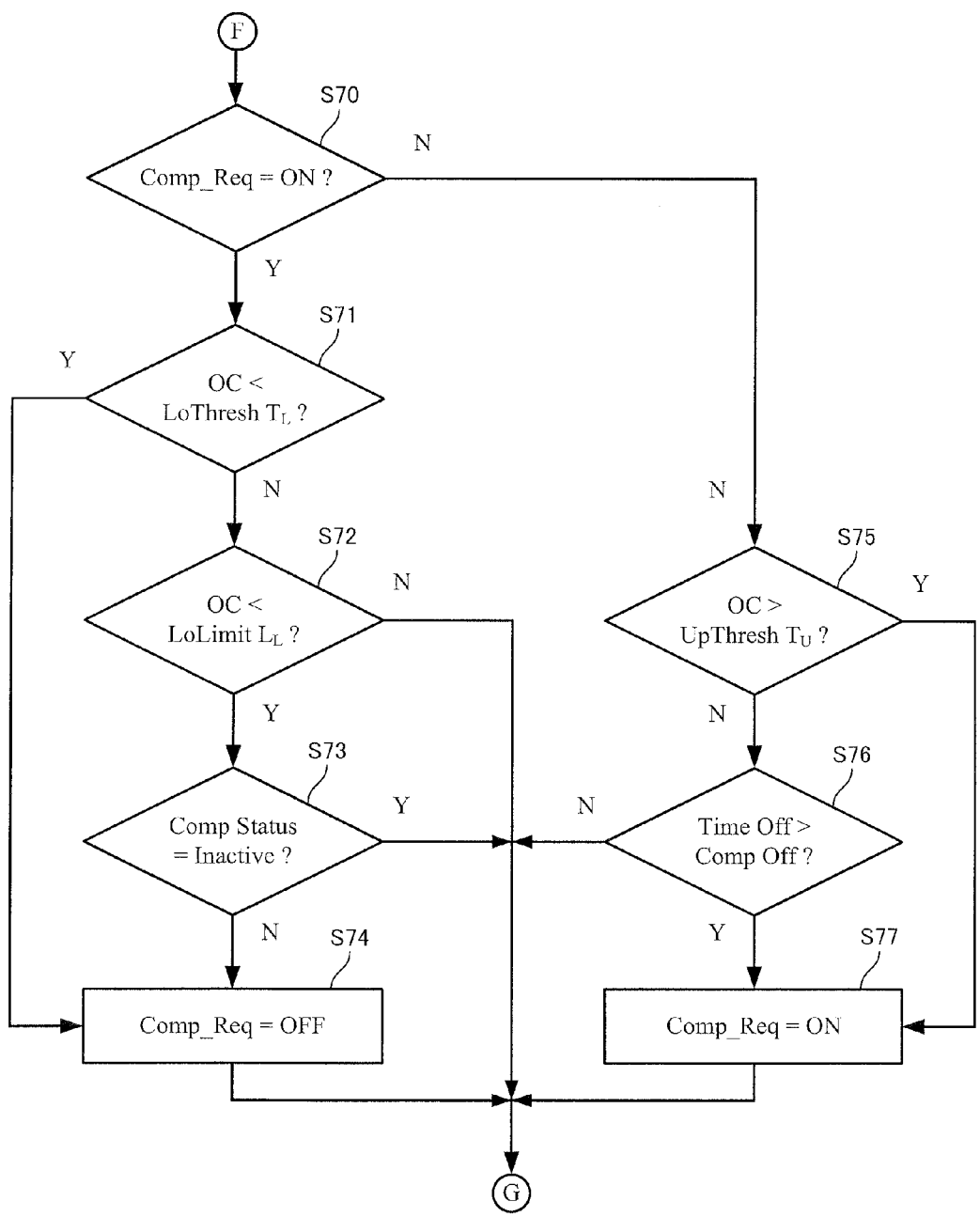
FIG. 11 is a sixth flowchart showing basic steps for controlling the cycling the compressor between the active and inactive states, where a lower limit based upon temperature is used to determine whether or not to change the compressor from the active state to the inactive, and a determined cycling time is used to determine whether or not to change the compressor from the inactive state to the active, in accordance with the third embodiment of the present invention.

In FIG. 11, the operational steps show logic for determining whether or not to change the compressor 28 between the active state and the inactive state using the lower limit $L_L$. However, instead of using the above described upper limit $L_U$, the calculated variable Comp Off is compared to the variable Time Off to determine whether or not a time delay is present in the current cycling of the compressor 28. Hence, the controller 30 changes the compressor 28 between the inactive state to the active state using a time measurement instead of the upper limit $L_U$.

Figure 12:
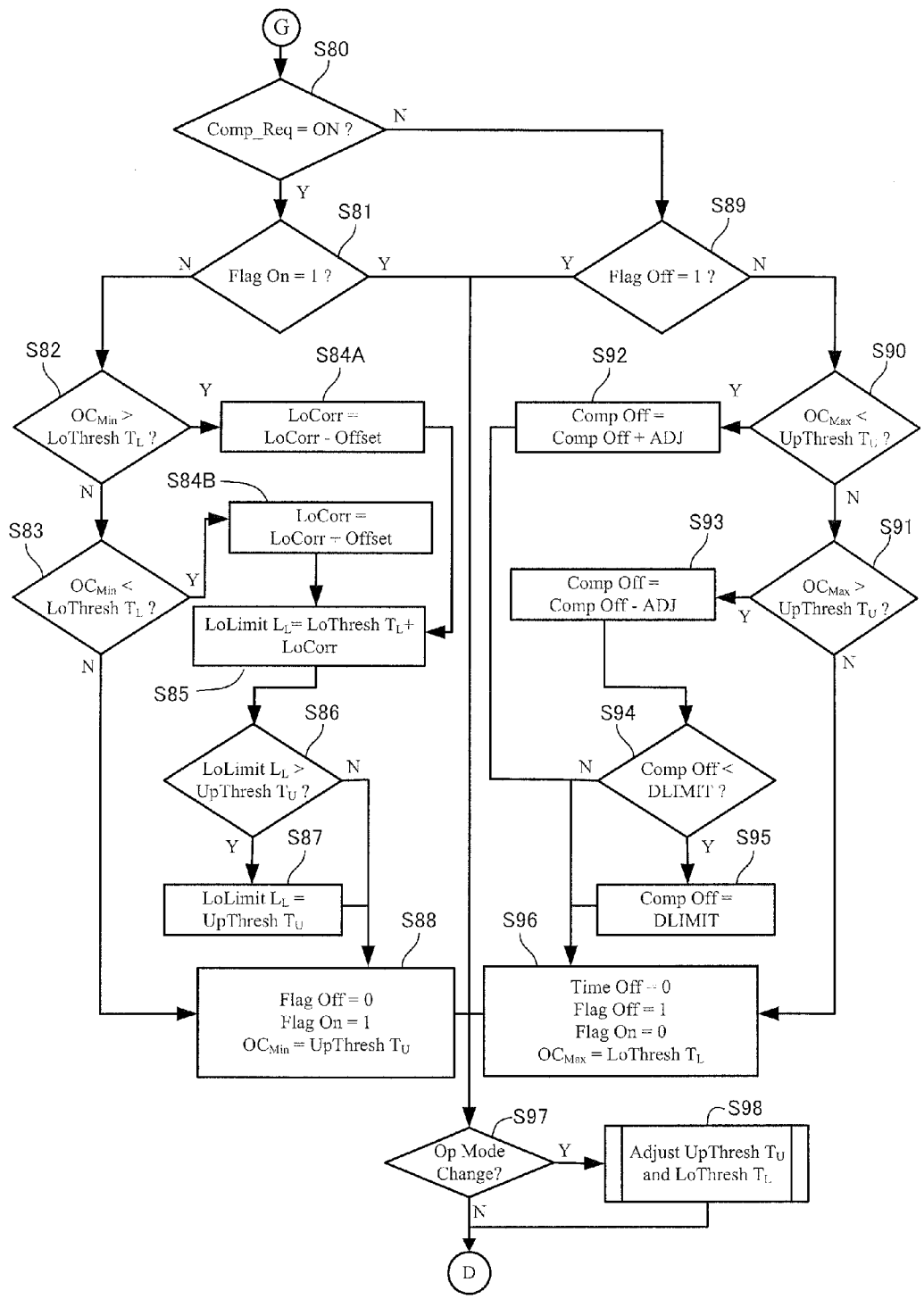
FIG. 12 is a seventh flowchart showing basic steps for effecting control of the air conditioning system, including compensating for time delays by adjusting the lower limit using a temperature based offset and adjusting the upper limit using a time based offset, where the adjusted the upper and lower limits are subsequently used to change the state of the compressor between the active state and the inactive state, in accordance with the third embodiment of the present invention.

In FIG. 12, in a manner similar to FIG. 8, the lower limit $L_L$ is adjusted to compensate for time delay(s). However, in FIG. 12, the variable Comp Off is redefined to correspond to a desired length of time that the compressor 28 should remain in the inactive state during the next cycling of the compressor 28 between the active and inactive states.

A description of one example of the logic of the third embodiment is now provided.

As indicated in FIG. 9, the controller 30 is configured or programmed to perform a comparison at step S50. Specifically, at step S50, the operating condition OC is compared to a stored $OC_{Old}$. Upon initialization of the controller 30, the variable $OC_{Old}$ is defined as being equal to, for example, operating condition OC at start-up. However, through each iteration of the logic in the flowcharts depicted in FIGS. 9-12, the variable $OC_{Old}$ is redefined, as described below.

In step S50, if the operating condition OC measured by the sensor 42 is greater than or equal to $OC_{Old}$, then operations move to step S51. If the operating condition OC is greater than or equal to $OC_{Old}$, then the compressor 28 appears to be in the inactive state (not compressing refrigerant). If the operating condition OC is not greater than or equal to $OC_{Old}$, then operations move to step S52 since the compressor 28 appears to be in the active state (compressing refrigerant).

At step S51 the variable Comp Status is defined as Inactive. The variable Comp Status is used in subsequent control steps, described below.

At step S52, the variable Comp Status is defined as Active. After either step S51 or step S52, operation moves to step S53.

During initialization of the controller 30, the variable $OC_{Min}$ is defined as being equal to the upper threshold $T_U$. The variable $OC_{Min}$ is re-defined in subsequent operations, as described below.

In step S53, the variable $OC_{Min}$ is compared to the operating condition OC. Specifically, at step S53, the controller 30 determines whether or not the variable $OC_{Min}$ is greater than the operating condition OC. If $OC_{Min}$ is greater than OC, then operations move to step S56. If $OC_{Min}$ is not greater than OC, then operations move to step S54.

At step S54, the operating condition OC is compared to the variable $OC_{Max}$. Specifically, if the operating condition OC is greater than $OC_{Max}$, then operation moves to step S55. If the operating condition OC is not greater than $OC_{Max}$, then operation moves to step S57.

At step S55, the variable $OC_{Max}$ is re-defined as being equal to the operating condition OC.

At step S56, the variable $OC_{Min}$ is re-defined as being equal to the operating condition OC. The variables $OC_{Max}$ and $OC_{Min}$ are used again in the logic depicted in FIG. 12.

At step S57, the variable $OC_{Old}$ is re-defined as being equal to the operating condition OC for the next iteration of the logic in the flowchart depicted in FIG. 9. After step S57, operation moves to the circle E, and to flowchart depicted in FIG. 10.

A description is now provided of the logic depicted in FIG. 10. The steps in FIG. 10 show logic that determines how long the compressor 28 is off in the current cycling of the compressor 28 between the active and inactive states.

At step S60, the controller 30 checks to see if the variable Comp_Req is equal to ON. As described above in the second embodiment, the variable Comp_Req is a marker that identifies the most recent instruction sent from the controller 30 to the compressor 28. The variable Comp_Req is not an indication of the actual status of the compressor 28 (active state or inactive state), but rather is an indication of what the controller 30 has most recently requested from the compressor 28.

At step S60, if Comp_Req is equal to ON, then operation move to the circle F at the bottom of FIG. 10, and on to the flowchart in FIG. 11. However, if Comp_Req is equal to Off (not equal to ON), then operation moves to step S61.

At step S61, the variable Time Off is re-defined. Initially (upon startup), variables Time Off and Loop Time are defined as 0.0 seconds. The variable Loop Time is a timer (as mentioned above) and is therefore continuously changing. Both Time Off and Loop Time are redefined with repeated iterations of the logic depicted in FIGS. 9-12.

At step S61, the variable Time Off is re-defined as being equal to Time Off plus Loop Time. At step S62, a determination is made with respect to the relationship between Time Off and the fixed variable $T_{MAX}$. Specifically, at step S62, if Time Off is greater than $T_{MAX}$, then operation moves to step S63. If Time Off is not greater than $T_{MAX}$, then operation moves to the circle F and the logic in the flowchart depicted in FIG. 11.

At step S63, Time Off is re-defined as being equal to $T_{MAX}$ for use in the next iteration of the flowcharts in FIGS. 9-12. Next operation moves to step S64. At step S64, the variable Comp Off is defined as being equal to $T_{MAX}$ plus Loop Time. Operation then moves to the circle F and the logic in the flowchart depicted in FIG. 11.

With reference to FIG. 11, at step S70, the controller 30 determines whether or not the variable Comp_Req is equal to ON. If the variable Comp_Req is equal to ON, then operation moves to step S71. If the variable Comp_Req is not equal to ON, then operations move to step S75.

At step S71, the controller 30 determines whether or not the operating condition OC is less than the lower threshold $T_L$. If the operating condition OC is less than the lower threshold $T_L$, then operation moves to step S74. If the operating condition OC is not less than the lower threshold $T_L$, then operation moves to step S72. Step S71 ensures that control of the compressor 28 changing from the active state to the inactive state is triggered by the lower threshold $T_L$ if the lower limit $L_L$ should somehow achieve a value less than the lower threshold $T_L$.

At step S72, the controller 30 determines whether or not the operating condition OC is less than the lower limit $L_L$. If the operating condition OC is less than the lower limit $L_L$, then operation moves to step S73. If the operating condition OC is not less than the lower limit $L_L$, then operation moves to the circle G and on to the logic depicted in FIG. 12.

At step S73, the controller 30 determines whether or not the variable Comp Status is equal to Inactive. If the variable Comp Status is equal to Inactive, then operation moves to the circle G and on to the logic depicted in FIG. 12. If the variable Comp Status is not equal to Inactive, then operation moves to step S74.

At step S74, the variable Comp_Req is made equal to OFF and the controller 30 sends a signal to the compressor to change from the active state to the inactive state. Then, operation moves to the circle G and on to the logic depicted in FIG. 12.

At step S75, the controller 30 determines whether or not the operating condition OC is greater than the upper threshold $T_U$. If the operating condition OC is greater than the upper threshold $T_U$, then operation moves to step S77. If the operating condition OC is not greater than the upper threshold $T_U$, then operation moves to step S76. Step S75 ensures that control of the compressor 28 changing from the inactive state to the active state is triggered by the upper threshold $T_U$ if the variable Time Off should somehow achieve a value greater than the variable Comp Off.

At step S76, the controller 30 determines whether or not the variable Time Off is greater than the variable Comp Off. If Time Off is greater than Comp Off, then operation moves to step S77. If Time Off is not greater than the variable Comp Off, then operation moves to the circle G and on to the logic depicted in FIG. 12.

At step S77, the variable Comp_Req is made equal to ON and the controller 30 sends a signal to the compressor to change from the inactive state to the active state. Then, operation moves to the circle G and on to the logic depicted in FIG. 12.

Description of the third embodiment continues now with specific reference to FIG. 12. In FIG. 12, the controller 30 performs the various steps depicted in the flowchart in order to repeatedly re-evaluate and/or adjust the lower limit $T_L$ and the time based variable Comp Off.

Upon startup of the air conditioning system 12, the controller 30 defines two variables Flag On and Flag Off. Initially, the variables Flag On and Flag Off are both made equal to 0 indicating that the compressor 28 has not cycled at all between the active state and the inactive state since startup. The variables Flag On and Flag Off are used in the logic shown in the flowchart in FIG. 12 to control subsequent re-evaluations of the lower limit $L_L$ and the time based variable Comp Off, as described below.

As shown in FIG. 12, at step S80, the controller 30 determines whether or not Comp_Req (from FIG. 11) is equal to ON or not. If Comp_Req is not equal to ON, then operations move to step S89. If Comp_Req is equal to ON in step S80, then operation moves to step S81.

At step S81, the controller determines whether or not Flag On is equal to one (1) or not. If the variable Flag On is equal to one (1), then operations move to step S97. If the variable Flag On is equal to one (1), then the compressor 28 has most recently cycled from the inactive state to the active state.

If Flag On is not equal to one (1), then operations move to step S82. At step S82, the controller 30 determines whether or not $OC_{Min}$ (from FIG. 9) is greater than the lower threshold $T_L$. If $OC_{Min}$ is greater than the lower threshold $T_L$, then operation moves to step S84A. If $OC_{Min}$ is not greater than the lower threshold $T_L$, then operation moves to step S83.

At step S83, the controller 30 determines whether or not $OC_{Min}$ (from FIG. 9) is less than the lower threshold $T_L$. If $OC_{Min}$ is less than the lower threshold $T_L$, then operation moves to step S84B. If $OC_{Min}$ is not less than the lower threshold $T_L$, then operation moves to step S88.

At step S84A, a variable LoCorr is made equal to a previous LoCorr minus an Offset. Initially, the variable LoCorr is made equal to zero on start up. However, with each iteration of the flowcharts depicted in FIGS. 9-12, the variable LoCorr is repeatedly redefined. The variable LoCorr is basically a holding variable that accumulates the adjustments (the Offset) that are made to the lower limit $L_L$ to compensate for time delays. A further explanation of the usefulness of the variable LoCorr is proved below with respect to steps S97 and S98. After step S84A, operation moves to step S85.

The Offset used in steps S84A and S84B can be the same in each step, or can be predetermined as being different in each step. In the depicted embodiment, the Offset has the same value in steps S84A and S84B. Specifically, when operating condition OC measured by the sensor 42 is temperature, the offset is a temperature related offset, such as 0.5° C. However, it should be understood from the drawings and the description herein that the Offset can be set anywhere within a range of degrees. For example, the Offset can have a value of anywhere between 0.01° C. and 1.0° C., depending upon, for example, the computational speed of the controller 30, the capacity of the air conditioning system 12 and/or the robustness desired from a system that includes a time delay compensation. More preferably, the Offset can have a value of anywhere between 0.1° C. and 0.5° C.

If the operating condition OC measured by the sensor 42 is pressure, the Offset can be 5 psig or less, and preferably is at least 1 psig.

At step S84B, the variable LoCorr is again utilize, but is made equal to LoCorr plus the Offset. After step S84B, operation moves to step S85.

At step S85, the lower limit $L_L$ is made equal to the lower threshold $T_L$ plus the variable LoCorr. The variable LoCorr includes the value of the Offset to compensate for time delay(s). Step S85 ensures that adjustments made to the lower limit $L_L$ are made relative to the lower threshold $T_L$. Thereafter, operation moves to step S86.

At step S86, the controller 30 compares the lower limit $L_L$ with the upper threshold $T_U$. If the lower limit $L_L$ is not greater than the upper threshold $T_U$, then operation moves to step S88. If the lower limit $L_L$ is greater than the upper threshold $T_U$, then operation moves to step S87.

At step S87, the lower limit $L_L$ is re-defined as being equal to the upper threshold $T_U$. By redefining the lower limit $L_L$ is re-defined as being equal to the upper threshold $T_U$, the controller 30 ensures that the lower limit $L_L$ never exceeds the upper threshold $T_U$. Thereafter, operation moves to step S88.

Finally, at step S88, the controller 30 defines Flag Off as equal to zero, Flag On as being equal to one (1) and $OC_{Min}$ as being equal to the upper threshold $T_U$. Thereafter, operation moves to step S97. It should be understood that variables defined at step S88 are being reset for the next iteration of the logic in FIGS. 9, 10, 11 and 12.

At step S89, the controller determines whether or not Flag Off is equal to one (1) or not. If the variable Flag Off is equal to one (1), then operations move to step S97. If the variable Flag Off is equal to one (1), then the compressor 28 has most recently cycled from the active state and the inactive state.

If Flag Off is not equal to one (1), then operations move to step S90. At step S90, the controller 30 determines whether or not $OC_{Max}$ (from FIG. 9) is less than the upper threshold $T_U$. If $OC_{Max}$ is less than the upper threshold $T_U$, then operation moves to step S92. If $OC_{Max}$ is not less than the upper threshold $T_U$, then operation moves to step S91.

At step S91, the controller 30 determines whether or not $OC_{Max}$ is greater than the upper threshold $T_U$. If $OC_{Max}$ is not greater than the upper threshold $T_U$, then operation moves to step S96. If $OC_{Max}$ is greater than the upper threshold $T_U$, then operation moves to step S93.

At step S92, the time based variable Comp Off is defined (or re-defined) as being equal to Comp Off plus a predetermined variable ADJ in order to compensate for an overcompensation of a time delay. Thereafter, operation moves to step S96. The predetermined variable ADJ is a time based offset that is predetermined based upon the capacity and responses of the air conditioning system 12. Preferably, the variable ADJ is between 0.01 seconds and 0.50 seconds but is more preferably between 0.02 seconds and 0.10 seconds.

At step S93, Comp Off is defined (or re-defined) as being equal to Comp Off minus ADJ in order to compensate a time delay. Thereafter, operation moves to step S94.

At step S94, the controller 30 compares Comp Off with the predetermined variable DLIMIT. If Comp Off is not less than DLIMIT, then operation moves to step S96. If Comp Off is less than the DLIMIT, then operation moves to step S95.

At step S95, Comp Off is re-defined as being equal to DLIMIT.

At step S96, the controller 30 defines Time Off as equal to one (1), Flag Off as equal to one (1), Flag On as being equal to zero (0) and $OC_{Max}$ as being equal to the lower threshold $T_L$. Thereafter, operation moves to step S97. It should be understood that variables defined at step S96 are being reset for the next iteration of the logic in FIGS. 9, 10, 11 and 12.

At step S97, the controller 30 determines whether or not a change has been made to the operating range of the air conditioning system 12. If the operating range has been changed, then at step S98 the upper threshold $T_U$ and the lower threshold $T_L$ are re-defined and operation moves to the circle D and back to FIG. 9. If no change has been made to the operating range, then operation moves to the circle D and back to FIG. 9.

The actions represented by steps S97 and S98 are optional. The air conditioning system 12 can optionally exclude these features. However, in the depicted embodiment, steps S97 and S98 are included.

As indicated by the operation at step S97, the controller 30 can be configured or programmed to operate in any of a plurality of different modes. For example, the air conditioning system 12 can operate in: the normal operating mode; the MAX operating mode; or the economy operating mode. Further, the air conditioning system 12 can optionally operate in other modes, such as that disclosed in U.S. Pat. No. 7,165,411, issued Jan. 23, 2007 and U.S. patent application Ser. No. 12/189,507, filed Aug. 11, 2008.

U.S. Pat. No. 7,165,411 and U.S. patent application Ser. No. 12/189,507 are discussed above in the third embodiment along with the normal operating mode, the MAX operating mode and the economy operating mode. The comments above also apply to the fourth embodiment.

Returning to step S97, the controller 30 is configured or programmed to change the operating range of the air conditioning system 12 in response to changes in the operating mode of the air conditioning system 12.

At step S97, if the operating range has changed from another mode to the normal operating mode, at step S98 the controller 30 redefines the upper threshold $T_U$ and the lower threshold $T_L$ as being equal to the default settings.

At step S97, if the operating range has changed from another mode to the MAX operating mode, at step S98 the controller 30 redefines the upper threshold $T_U$ and the lower threshold $T_L$ as being equal to predefined MAX settings.

At step S97, if the operating range has changed from another mode to the economy operating mode, at step S98 the controller 30 redefines the upper threshold $T_U$ and the lower threshold $T_L$ as being equal to predefined economy settings.

At step S97, if the operating range has changed from another mode to the one of the operating modes in the commonly assigned patent documents, at step S98 the controller 30 redefines the upper threshold $T_U$ and the lower threshold $T_L$ accordingly.

Thus, in each subsequent iteration of the logic in FIGS. 9-12, at step S85 the lower limit $L_L$ is adjusted with the variable LoCorr which include the current Offset. Further, the lower limit $L_L$ is adjusted relative to the current value of the lower threshold $T_L$.

Using the above described logic, both the lower limit $L_L$ and the time based variable Comp Off can be repeatedly re-evaluate and re-calculate in order to compensate for detected time delays.

Fourth Embodiment

Referring now to the flowcharts in FIGS. 13, 14, 15 and 16, various operational steps performed by the controller 30 to operate the compressor 28 in accordance with a fourth embodiment will now be explained. The components of the air conditioning system 12, as described above are not changed in the fourth embodiments. Only the configuration and/or programming of the controller 30 is changed. Therefore, in view of the similarity between the first and fourth embodiments, the parts of the fourth embodiment that are identical to the parts of the first embodiment will be given the same reference numerals as the parts of the first embodiment.

In the fourth embodiment, the controller 30 is configured and/or programmed to operate the compressor 28 in response to changes in the operating condition OC, where the operating condition OC is temperature measured at the low pressure section of the air conditioning system 12, for example, on, in or proximate the evaporator 26. However, it should be understood from the drawings and the description herein that the basic logic represented in FIGS. 13-16 can alternatively be used with the sensor 42 measuring refrigerant pressure at the low pressure section of the air conditioning system 12.

Figure 13:
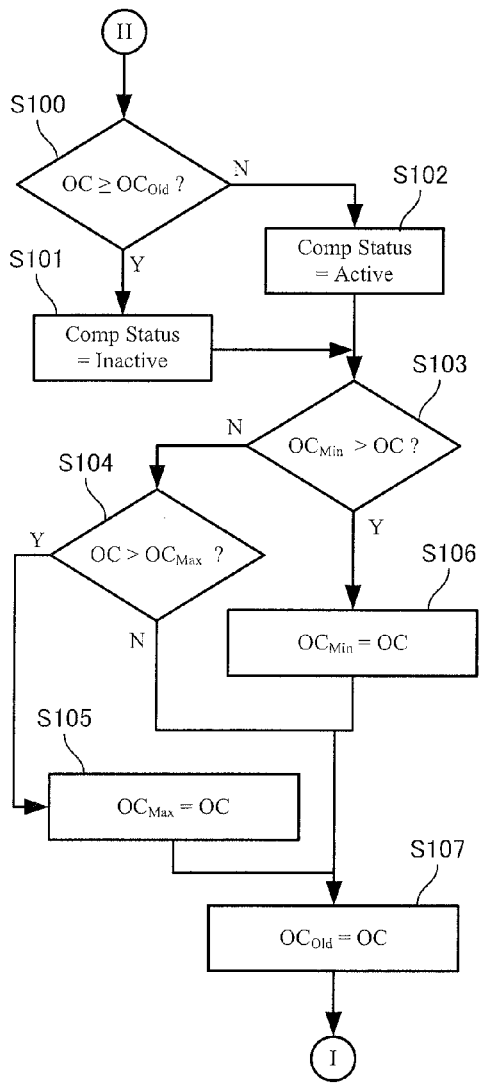
FIG. 13 is an eighth flowchart similar to the flowchart in FIG. 9, showing basic steps for effecting control of the air conditioning system, including evaluating the status or state of the compressor (active or inactive) and defining variables used in subsequent processing steps shown in FIGS. 13-16, in accordance with a fourth embodiment of the present invention.

In the fourth embodiment, FIG. 13 depicts operational steps that show logic for collecting information regarding the operation condition and variables used in subsequent logic are defined (and re-defined).

Figure 14:
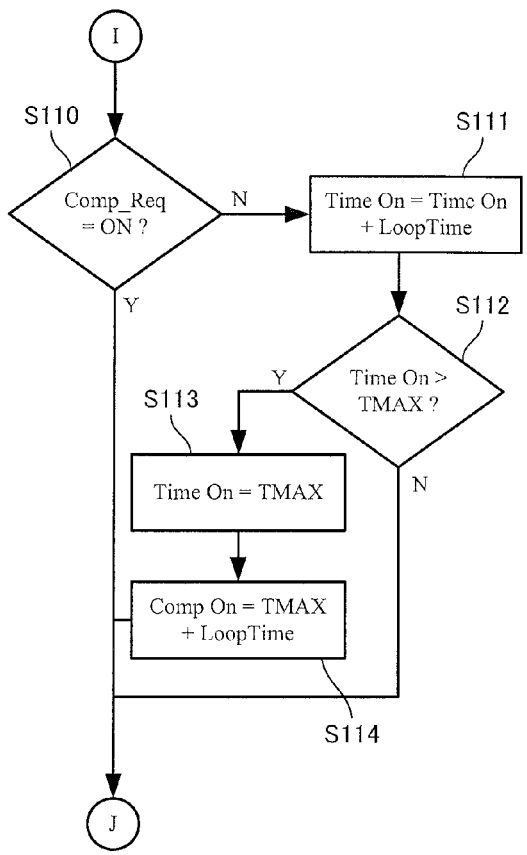
FIG. 14 is an ninth flowchart showing basis steps for determining how long the compressor is in the active state when cycling between the active state and the inactive state in accordance with the fourth embodiment of the present invention.

In FIG. 14, logic for a timing sequence is depicted where time delays are determined in terms of actual time that the compressor 28 is in the inactive state. In FIG. 14, a fixed variable $T_{MAX}$ is predetermined based upon the overall design of the air conditioning system 12 and anticipated requirements of the air conditioning system 12. The fixed variable $T_{MAX}$ represents an absolute maximum amount of time that the compressor 28 should be allowed to remain in the active state with the air conditioning system 12 operating and cooling is requested. Also, a fixed variable DLIMIT represents an absolute minimum amount of time that the compressor 28 should be allowed to remain in the active state with the air conditioning system 12 operating and cooling is requested.

In FIG. 14, the time between iterations of the logic in FIGS. 13-16 is measured via the variable Loop Time. As in the third embodiment Loop Time is linked directly to an internal clock within the controller 30 and measures the time between iterations of the logic in FIGS. 13-16. Consequently, each time the logic cycles through FIGS. 13-16, Loop Time is reset like a stop watch. Consequently, a variable Time On (see step S111, below) is increased with each iteration until the variable Time On exceeds the fixed variable $T_{MAX}$, as described in greater detail below.

Figure 15:
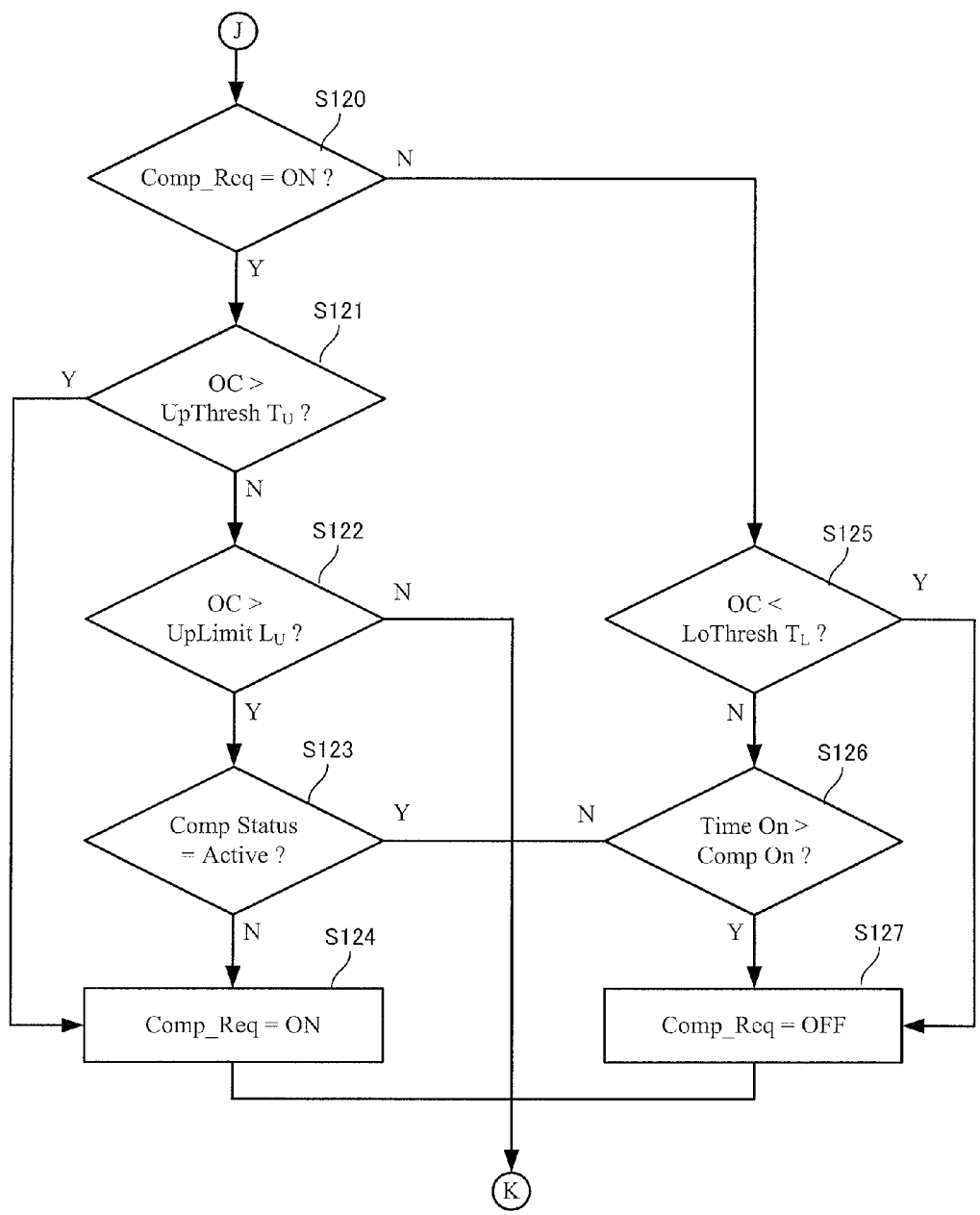
FIG. 15 is a tenth flowchart showing basic steps for controlling the cycling the compressor between the active and inactive states, where an upper limit based upon temperature is used to determine whether or not to change the compressor from the inactive state to the active, and a determined cycling time is used to determine whether or not to change the compressor from the active state to the inactive, in accordance with the fourth embodiment of the present invention.

In FIG. 15, the operational steps show logic for determining whether or not to change the compressor 28 between the inactive state and the active state using the upper limit $L_U$. However, instead of using the above described lower limit $L_L$, the calculated variable Comp On is compared to the variable Time On to determine whether or not a time delay is present in the current cycling of the compressor 28. Hence, the controller 30 changes the compressor 28 between the active state to the inactive state using a time measurement instead of the lower limit $L_L$.

Figure 16:
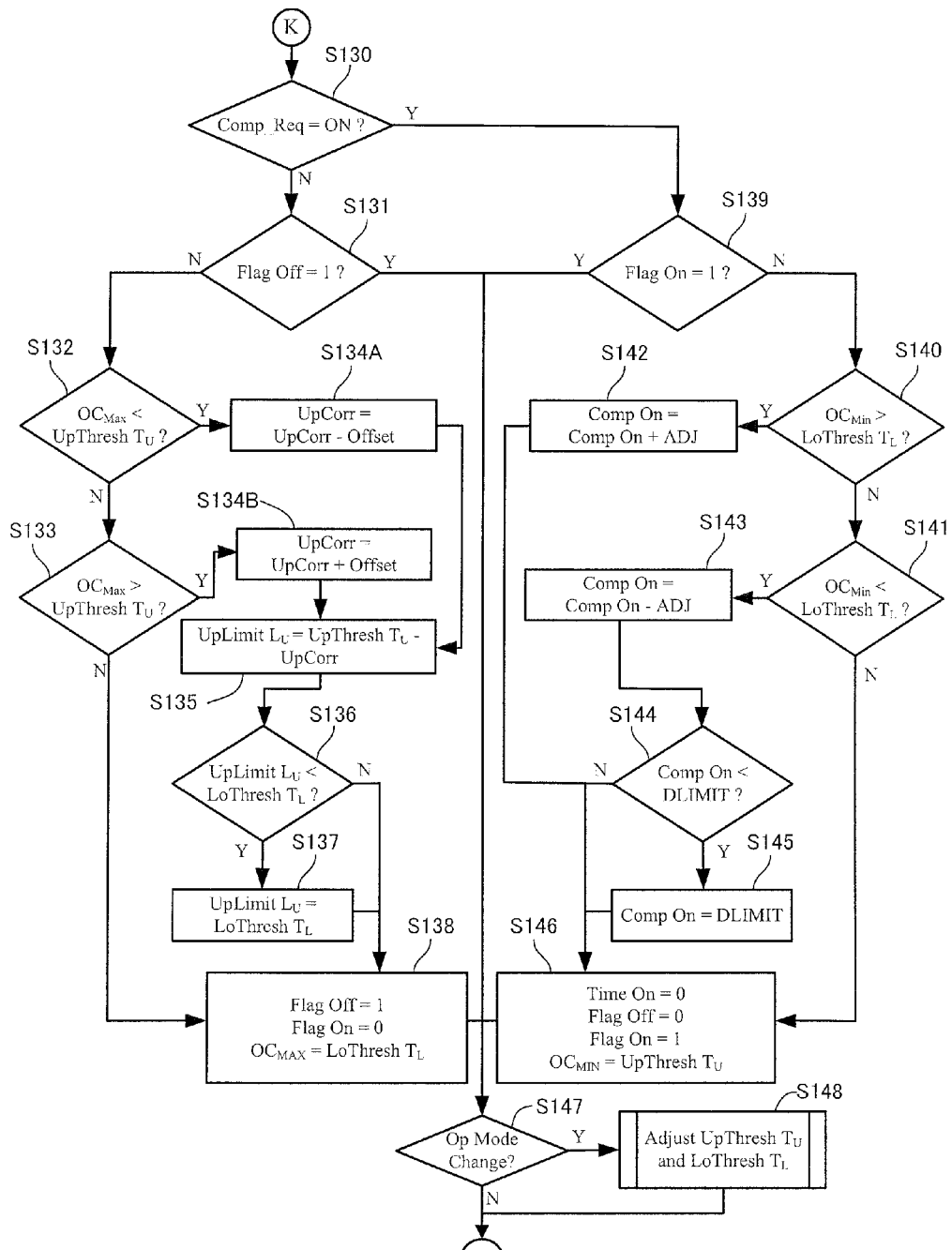
FIG. 16 is a eleventh flowchart showing basic steps for effecting control of the air conditioning system, including compensating for time delays by adjusting the upper limit using a temperature based offset and adjusting the lower limit using a time based offset, where the adjusted the upper and lower limits are subsequently used to change the state of the compressor between the active state and the inactive state, in accordance with the fourth embodiment of the present invention.

In FIG. 16, in a manner similar to FIG. 8, the upper limit $L_U$ is adjusted to compensate for time delay(s). However, in FIG. 16, the variable Comp On is redefined to correspond to a desired length of time that the compressor 28 should remain in the active state during the next cycling of the compressor 28 between the inactive and active states.

A description of one example of the logic of the fourth embodiment is now provided.

As indicated in FIG. 13, the controller 30 is configured or programmed to perform a comparison at step S100. Specifically, at step S100, the operating condition OC is compared to a stored $OC_{Old}$. Upon initialization of the controller 30 (upon startup), the variable $OC_{Old}$ is defined as being equal to, for example, the operating condition OC at start-up. However, through each iteration of the logic in the flowcharts depicted in FIGS. 13-16, the variable $OC_{Old}$ is redefined, as described below.

In step S100, if the operating condition OC measured by the sensor 42 is greater than or equal to $OC_{Old}$, then operations move to step S101. If the operating condition OC is greater than or equal to $OC_{Old}$, then the compressor 28 appears to be in the inactive state (not compressing refrigerant). If the operating condition OC is not greater than or equal to $OC_{Old}$, then operations move to step S102 since the compressor 28 appears to be in the active state (compressing refrigerant).

At step S101 the variable Comp Status is defined as Inactive. The variable Comp Status is used in subsequent control steps, described below.

At step S102, the variable Comp Status is defined as Active. After either step S101 or step S102, operation moves to step S103.

During initialization of the controller 30, the variable $OC_{Min}$ is defined as being equal to the upper threshold $T_U$. The variable $OC_{Min}$ is re-defined in subsequent operations, as described below.

In step S103, the variable $OC_{Min}$ is compared to the operating condition OC. Specifically, at step S103, the controller 30 determines whether or not the variable $OC_{Min}$ is greater than the operating condition OC. If $OC_{Min}$ is greater than OC, then operations move to step S106. If $OC_{Min}$ is not greater than OC, then operations move to step S104.

At step S104, the operating condition OC is compared to the variable $OC_{Max}$. Specifically, if the operating condition OC is greater than $OC_{Max}$, then operation moves to step S105. If the operating condition OC is not greater than $OC_{Max}$, then operation moves to step S107.

At step S105, the variable $OC_{Max}$ is re-defined as being equal to the operating condition OC.

At step S106, the variable $OC_{Min}$ is re-defined as being equal to the operating condition OC. The variables $OC_{Max}$ and $OC_{Min}$ are used again in the logic depicted in FIG. 16.

At step S107, the variable $OC_{Old}$ is re-defined as being equal to the operating condition OC for the next iteration of the logic in the flowchart depicted in FIG. 13. After step S107, operation moves to the circle I, and to flowchart depicted in FIG. 14.

A description is now provided of the logic depicted in FIG. 14. The steps in FIG. 14 show logic that determines how long the compressor 28 is on in the current cycling of the compressor 28 between the inactive and active states.

At step S110, the controller 30 checks to see if the variable Comp_Req is equal to ON. As described above in the second embodiment, the variable Comp_Req is a marker that identifies the most recent instruction sent from the controller 30 to the compressor 28. The variable Comp_Req is not an indication of the actual status of the compressor 28 (active state or inactive state), but rather is an indication of what the controller 30 has most recently requested from the compressor 28.

At step S110, if Comp_Req is equal to ON, then operation move to the circle J at the bottom of FIG. 14, and on to the flowchart in FIG. 15. However, if Comp_Req is equal to Off (not equal to ON), then operation moves to step S111.

At step S111, the variable Time On is re-defined. Initially (upon startup), variables Time On and Loop Time are defined as 0.0 seconds. The variable Loop Time is a timer (as mentioned above) and is therefore continuously changing. Both Time On and Loop Time are redefined with repeated iterations of the logic depicted in FIGS. 13-16.

At step S111, the variable Time On is re-defined as being equal to Time On plus Loop Time. At step S112, a determination is made with respect to the relationship between Time On and the fixed variable $T_{MAX}$. Specifically, at step S112, if Time On is greater than $T_{MAX}$, then operation moves to step S113. If Time On is not greater than $T_{MAX}$, then operation moves to the circle J and the logic in the flowchart depicted in FIG. 15.

At step S113, Time On is re-defined as being equal to $T_{MAX}$ for use in the next iteration of the flowcharts in FIGS. 13-16. Next operation moves to step S114. At step S114, a variable Comp On is defined as being equal to $T_{MAX}$ plus Loop Time. Operation then moves to the circle J and the logic in the flowchart depicted in FIG. 15.

With reference to FIG. 15, at step S120, the controller 30 determines whether or not the variable Comp_Req is equal to ON. If the variable Comp_Req is equal to ON, then operation moves to step S121. If the variable Comp_Req is not equal to ON, then operations move to step S125.

At step S121, the controller 30 determines whether or not the operating condition OC is less than the lower threshold $T_L$. If the operating condition OC is greater than the upper threshold $T_U$, then operation moves to step S124. If the operating condition OC is not greater than the upper threshold $T_U$, then operation moves to step S122. Step S121 ensures that control of the compressor 28 changing from the inactive state to the active state is triggered by the upper threshold $T_U$ if the upper limit $L_U$ should somehow achieve a value greater than the upper threshold $T_U$.

At step S122, the controller 30 determines whether or not the operating condition OC is greater than the upper limit $L_U$. If the operating condition OC is greater than the upper limit $L_U$, then operation moves to step S123. If the operating condition OC is not greater than the upper limit $L_U$, then operation moves to the circle K and on to the logic depicted in FIG. 16.

At step S123, the controller 30 determines whether or not the variable Comp Status is equal to Active. If the variable Comp Status is equal to Active, then operation moves to the circle K and on to the logic depicted in FIG. 16. If the variable Comp Status is not equal to Active, then operation moves to step S124.

At step S124, the variable Comp_Req is made equal to ON and the controller 30 sends a signal to the compressor 28 to change from the inactive state to the active state. Then, operation moves to the circle K and on to the logic depicted in FIG. 16.

At step S125, the controller determines whether or not the operating condition OC is less than the lower threshold $T_L$. If the operating condition OC is less than the lower threshold $T_L$, then operation moves to step S127. If the operating condition OC is not less than the lower threshold $T_L$, then operation moves to the circle K and on to the logic depicted in FIG. 16. Step S125 ensures that control of the compressor 28 changing from the active state to the inactive state is triggered by the lower threshold $T_L$ if the variable Time On should somehow achieve a value greater than the variable Comp On.

At step S127, the variable Comp_Req is made equal to OFF and the controller 30 sends a signal to the compressor to change from the active state to the inactive state. Then, operation moves to the circle K and on to the logic depicted in FIG. 16.

Description of the fourth embodiment continues now with specific reference to FIG. 16. In FIG. 16, the controller 30 performs the various steps depicted in the flowchart in order to repeatedly re-evaluate and/or adjust the upper limit $T_U$ and the time based variable Comp On.

Upon startup of the air conditioning system 12, the controller 30 defines two variables Flag On and Flag Off. Initially, the variables Flag On and Flag Off are both made equal to 0 indicating that the compressor 28 has not cycled at all between the active state and the inactive state since startup. The variables Flag On and Flag Off are used in the logic shown in the flowchart in FIG. 16 to control subsequent re-evaluations of the upper limit $L_U$ and the time based variable Comp On, as described below.

As shown in FIG. 16, at step S130, the controller 30 determines whether or not Comp_Req is equal to ON or not. If Comp_Req is equal to ON, then operations move to step S139. If Comp_Req is not equal to ON in step S130, then operation moves to step S131.

At step S131, the controller determines whether or not Flag Off is equal to one (1) or not. If the variable Flag Off is equal to one (1), then operations move to the step S147. If the variable Flag Off is equal to one (1), then the compressor 28 has most recently cycled from the inactive state and the active state.

If Flag Off is not equal to one (1), then operations move to step S132. At step S132, the controller 30 determines whether or not $OC_{Max}$ is less than the upper threshold $T_U$. If $OC_{Max}$ is less than the upper threshold $T_U$, then operation moves to step S134A. If $OC_{Max}$ is not less than the upper threshold $T_U$, then operation moves to step S133.

At step S133, the controller 30 determines whether or not $OC_{Max}$ is greater than the upper threshold $T_U$. If $OC_{Max}$ is greater than the upper threshold $T_U$, then operation moves to step S134B. If $OC_{Max}$ is not greater than the upper threshold $T_U$, then operation moves to step S138.

At step S134A, a variable UpCorr is made equal to a previous UpCorr minus the Offset. The variable UpCorr is initially defined by the controller 30 at startup as being equal to zero. Thereafter, operation moves to step S135.

Similarly, at step 134B, the variable UpCorr is again utilized, but is made equal to the previous value of UpCorr plus the Offset.

At step S135, the upper limit $L_U$ is made equal to the value of the upper threshold $T_U$ minus the variable UpCorr. The variable UpCorr includes the value of the Offset to compensate for time delay(s). Step S135 ensures that changes to the upper limit $L_U$ are made relative to the value of the upper threshold $T_U$. Thereafter, operation moves to step S136.

The Offset used in steps S134A and S134B can be the same in each step, or can be predetermined as being different in each step. In the depicted embodiment, the Offset is the same in the steps S134A and S134B. Specifically, the Offset is a temperature related offset, such as 0.5° C. However, it should be understood from the drawings and the description herein that the Offset can be set anywhere within a range of degrees. For example, the Offset can have a value of anywhere between 0.01° C. and 1.0° C., depending upon, for example, the computational speed of the controller 30, the capacity of the air conditioning system 12 and/or the robustness desired from a system that include a time delay compensation. More preferably, the Offset can have a value of anywhere between 0.1° C. and 0.5° C.

If the operating condition OC is pressure, the Offset can be 5 psig or less, and preferably is 1 psig.

At step S136, the controller 30 compares the upper limit $L_U$ with the lower threshold $T_L$. If the upper limit $L_U$ is not less than the lower threshold $T_L$, then operation moves to step S138. If the upper limit $L_U$ is less than the lower threshold $T_L$, then operation moves to step S137.

At step S137, the upper limit $L_U$ is re-defined as being equal to the lower threshold $T_L$. By redefining the upper limit $L_U$ as being equal to the lower threshold $T_L$, the controller 30 ensures that the upper limit $L_U$ never falls below the lower threshold $T_L$.

Finally, at step S138, the controller 30 defines Flag Off as equal to one (1), Flag On as being equal to zero (0) and $OC_{Max}$ as being equal to the lower threshold $T_L$. It should be understood that variables defined at step S138 are being reset for the next iteration of the logic in FIGS. 13, 14, 15 and 16. Thereafter, operation moves to step S147.

At step S139, the controller determines whether or not Flag On is equal to one (1) or not. If the variable Flag On is equal to one (1), then operations move to step 147. If the variable Flag On is equal to one (1), then the compressor 28 has most recently cycled from the active state and the inactive state.

If Flag On is not equal to one (1), then operations move to step S140. At step S140, the controller 30 determines whether or not $OC_{Min}$ is greater than the lower threshold $T_L$. If $OC_{Min}$ is greater than the lower threshold $T_L$, then operation moves to step S142. If $OC_{Min}$ is not greater than the lower threshold $T_L$, then operation moves to step S141.

At step S141, the controller 30 determines whether or not $OC_{Min}$ is less than the lower threshold $T_L$. If $OC_{Min}$ is not less than the lower threshold $T_L$, then operation moves to step S146. If $OC_{Min}$ is less than the lower threshold $T_L$, then operation moves to step S143.

At step S142, the time based variable Comp On is defined (or re-defined) as being equal to Comp On plus a predetermined variable ADJ in order to compensate for an overcompensation of a time delay. Thereafter, operation moves to step S146. The predetermined variable ADJ is a time based offset that is predetermined based upon the capacity and responses of the air conditioning system 12. Preferably, the variable ADJ is between 0.01 seconds and 0.50 seconds but is more preferably between 0.02 seconds and 0.10 seconds.

At step S143, Comp On is defined (or re-defined) as being equal to Comp On minus ADJ in order to compensate a time delay. Thereafter, operation moves to step S144.

At step S144, the controller 30 compares Comp On with the predetermined variable DLIMIT. If Comp On is not less than DLIMIT, then operation moves to step S146. If Comp On is less than the DLIMIT, then operation moves to step S145.

At step S145, Comp On is re-defined as being equal to DLIMIT.

Finally, at step S146, the controller 30 defines Time On as equal to zero (0), Flag Off as equal to zero (0), Flag On as being equal to one (1) and $OC_{Min}$ as being equal to the upper threshold $T_U$. Thereafter, operation moves to step S147. It should be understood that variables defined at step S146 are being reset for the next iteration of the logic in FIGS. 13, 14, 15 and 16.

At step S147, the controller 30 determines whether or not a change has been made to the operating range of the air conditioning system 12. If the operating range has been changed, then at step S148 the upper threshold $T_U$ and the lower threshold $T_L$ are re-defined and operation moves to the circle H and back to FIG. 13. If no change has been made to the operating range, then operation moves to the circle H and back to FIG. 13.

The actions represented by steps S147 and S148 are optional. The air conditioning system 12 can optionally exclude these features. However, in the depicted embodiment, steps S147 and S148 are included.

As indicated by the operation at step S147, the controller 30 can be configured or programmed to operate in any of a plurality of different modes. For example, the air conditioning system 12 can operate in: the normal operating mode; the MAX operating mode; or the economy operating mode. Further, the air conditioning system 12 can optionally operate in other modes, such as that disclosed in U.S. Pat. No. 7,165,411, issued Jan. 23, 2007 and U.S. patent application Ser. No. 12/189,507, filed Aug. 11, 2008.

U.S. Pat. No. 7,165,411 and U.S. patent application Ser. No. 12/189,507 are discussed above in the third embodiment along with the normal operating mode, the MAX operating mode and the economy operating mode. The comments above also apply to the fourth embodiment.

Returning to step S147, the controller 30 is configured or programmed to change the operating range of the air conditioning system 12 in response to changes in the operating mode of the air conditioning system 12.

At step S147, if the operating range has changed from another mode to the normal operating mode, at step S148 the controller 30 redefines the upper threshold $T_U$ and the lower threshold $T_L$ as being equal to the default settings.

At step S147, if the operating range has changed from another mode to the MAX operating mode, at step S148 the controller 30 redefines the upper threshold $T_U$ and the lower threshold $T_L$ as being equal to predefined MAX settings.

At step S147, if the operating range has changed from another mode to the economy operating mode, at step S148 the controller 30 redefines the upper threshold $T_U$ and the lower threshold $T_L$ as being equal to predefined economy settings.

At step S147, if the operating range has changed from another mode to the one of the operating modes in the commonly assigned patent documents, at step S148 the controller 30 redefines the upper threshold $T_U$ and the lower threshold $T_L$ accordingly.

Thus, in each subsequent iteration of the logic in FIGS. 13-16, at step S135 the upper limit $L_U$ is adjusted with the variable UpCorr which include the current Offset. Further, the upper limit $L_U$ is adjusted relative to the current value of the upper threshold $T_U$.

After either of steps S147 and S148, operation moves to the circle H and back to FIG. 13.

Using the above described logic, both the upper limit $L_U$ and the time based variable Comp On can be repeatedly re-evaluate and re-calculate in order to compensate for detected time delays.

The controller 30 can include a microcomputer with an air conditioning system control program that controls the compressor 28, as discussed below. The controller 30 can also include other conventional components such as an input interface circuit, an output interface circuit, memory circuits and storage devices such as a ROM (Read Only Memory) device and a RAM (Random Access Memory) device. The memory circuit stores processing results and control programs such as ones for compressor operation and overall air conditioning system control that are run by the processor circuit. The internal RAM of the controller 30 stores statuses of operational flags and various control data. The internal ROM of the controller 30 stores various default settings, variables, control code, etc, for various operations. The controller 30 is capable of selectively controlling any of the components of the air conditioning system 12 in accordance with the control program. It will be apparent to those skilled in the art from this disclosure that the precise structure and algorithms for the controller 30 can be any combination of hardware and software that will carry out the functions of the present invention.

The various elements of the vehicle 10 and the air conditioning system 12 (other than the configurations and/or programming of the controller 30) are conventional components that are well known in the art. Since these various elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

The term "detect" and "measure" as used herein to describe an operation or function carried out by a component, a section, a device or the like, such as the sensor 42, includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle air conditioning system, comprising:
   a low pressure section including an air conditioning evaporator, the low pressure section having a prescribed operating range bounded by at least a first fixed operation threshold;
   a compressor in fluid communication with the air conditioning evaporator;
   a sensor arranged to detect an operating condition of the low pressure section; and
   a controller operably connected to the sensor and the compressor, the controller initially controlling operation of the compressor to switch from one of inactive and active states to the other in response to detecting that the operating condition is equal to or surpasses the first operation threshold,
   the controller further determining a first time delay corresponding to a time occurring between initiating the switch from the one of the inactive and active states to the other of the compressor and an actual change in the operating condition due to the switch from the one of the inactive and active states to the other of the compressor; and
   the controller further subsequently defining a first limit that is offset from the first operation threshold such that the controller controls the operation of the compressor to subsequently switch from the one of inactive and active states to the other in response to detecting that the operating condition is equal to or surpasses the first limit, the controller being further configured to repeatedly re-adjust the first limit in response to re-determining the first time delay.

2. The vehicle air conditioning system according to claim 1, wherein
the controller defines the first limit so as to compensate for the first time delay in order to have the actual change in the state of the compressor occur at a time with the operating condition being closer to the first operation threshold than the first limit.

3. The vehicle air conditioning system according to claim 1, wherein
the controller determines the first time delay corresponding to a time occurring between initiating the switch from the inactive state of the compressor to the active state of the compressor.

4. The vehicle air conditioning system according to claim 1, wherein
the controller determines the first time delay corresponding to a time occurring between initiating the switch from the active state of the compressor to the inactive state of the compressor.

5. The vehicle air conditioning system according to claim 4, wherein
the controller determines a second time delay corresponding to a time occurring between initiating the switch from the inactive state of the compressor to the active state of the compressor and
the controller further subsequently defining a second limit that is offset from a second operation threshold such that the controller controls the operation of the compressor to subsequently switch from the inactive state of the compressor to the active state of the compressor in response to detecting that the operating condition is equal to or surpasses the second limit.

6. The vehicle air conditioning system according to claim 1, wherein
the operating condition detected by the sensor is a refrigerant pressure level measured at the low pressure section of the vehicle air conditioning system proximate the evaporator and the prescribed operating range is defined between an upper pressure threshold and a lower pressure threshold, with one of the upper pressure threshold and the lower pressure threshold defining the first operation threshold.

7. The vehicle air conditioning system according to claim 6, wherein
the controller is configured to repeatedly re-adjust the first limit by incrementally changing a pressure value of the first limit in response to re-determining the first time delay.

8. The vehicle air conditioning system according to claim 1, wherein
the operating condition detected by the sensor is a temperature level measured at one of the following: air downstream from the evaporator, surface temperature of the evaporator, and refrigerant temperature within the evaporator, and
the prescribed operating range is defined between an upper temperature threshold and a lower temperature threshold, with one of the upper temperature threshold and the lower temperature threshold defining the first operation threshold.

9. The vehicle air conditioning system according to claim 8, wherein
the controller is configured to repeatedly re-adjust the first limit by incrementally changing a temperature value of the first limit in response to re-determining the first time delay.

10. A method of controlling a vehicle air conditioning system comprising:
setting a first operation threshold for a prescribed operating range of an air conditioning evaporator;
detecting an operating condition of the air conditioning evaporator;
initially controlling operation of a compressor to switch from one of inactive and active states to the other in response to detecting that the operating condition is equal to or surpassing the first operation threshold;
determining a first time delay corresponding to a time occurring between initiating the switch from the one of the inactive and active states to the other of the compressor and an actual change in the operating condition due to the switch from the one of the inactive and active states to the other of the compressor;
setting a first limit to compensate for the first time delay that was detected; and
subsequently controlling the operation of the compressor to switch from the one of inactive and active states to the other in response to detecting that the operating condition is equal to or surpasses the first limit.

11. The method of controlling a vehicle air conditioning system according to claim 10, wherein
the setting of the first limit is performed so as to compensate for the first time delay in order to have the actual change in the state of the compressor occur at a time with the operating condition is closer to the first operation threshold than the first limit.

12. The method of controlling a vehicle air conditioning system according to claim 10, wherein
the determining of the first time delay is performed corresponding to a time occurring between initiating the switch from the inactive state of the compressor to the active state of the compressor.

13. The method of controlling a vehicle air conditioning system according to claim 10, wherein
the determining of the first time delay is performed corresponding to a time occurring between initiating the switch from the active state of the compressor to the inactive state of the compressor.

14. The method of controlling a vehicle air conditioning system according to claim 13, further comprising
determining a second time delay corresponding to a time occurring between initiating the switch from the inactive state of the compressor to the active state of the compressor;
setting a second limit to compensate for the second time delay that was detected; and
subsequently controlling the operation of the compressor to switch from the inactive state of the compressor to the active state of the compressor in response to detecting that the operating condition is equal to or surpasses the second limit.

15. The method of controlling a vehicle air conditioning system according to claim 10, wherein
the detecting of the operating condition is performed with the sensor detecting a refrigerant pressure level measured at the low pressure section of the vehicle air conditioning system proximate the evaporator, and the prescribed operating range is set between an upper pressure threshold and a lower pressure threshold, with one of the upper pressure threshold and the lower pressure threshold defining the first operation threshold.

16. The method of controlling a vehicle air conditioning system according to claim 10, wherein
the detecting of the operating condition is performed with the sensor detecting a temperature level measured at one of the following: air downstream from the evaporator, surface temperature of the evaporator, and refrigerant temperature within the evaporator; and
the prescribed operating range is set between an upper temperature threshold and a lower temperature threshold, with one of the upper temperature threshold and the lower temperature threshold defining the first operation threshold.

17. The method according to claim 10, wherein
the setting of the first limit includes repeatedly re-adjusting the first limit in response to re-determining the first time delay.

18. A method of controlling a vehicle air conditioning system, comprising:
setting at least one of an activation threshold for an air conditioning evaporator and a deactivation threshold for the air conditioning evaporator;
detecting changes in an operating condition of the air conditioning evaporator;
activating a compressor to compress refrigerant in response to detecting that the operating condition is equal to or greater than the activation threshold;
deactivating the compressor to cease compressing refrigerant in response to detecting that the operating condition is equal to or less than the lower threshold;
determining at least one of the following:
a first time delay between the requesting of the activation of the compressor and an actual activation of the compressor; and
a second time delay between the requesting of the deactivation of the compressor and the actual deactivation of the compressor; and
setting a corresponding one of:
a first upper limit in response to determination of the first time delay to compensate for the detected first time delay such that the compressor subsequently begins compressing refrigerant with the detected changes in the operating condition being closer to the activation threshold than the first upper limit, and
a second lower limit in response to determination of the second time delay to compensate for the detected second time delay such that the compressor ceases compressing refrigerant with the detected changes in the operating condition being closer to the deactivation threshold than the second lower limit.

19. The method according to claim 18, wherein
the determining of at least one of the first and second time delays is performed such that both the first time delay and the second time delay are determined, and both the first limit and the second limit are re-adjusted to compensate for the determined first and second time delays.

20. The method according to claim 18, wherein
the detecting changes in the operating condition is performed such that the operating condition is a temperature detected proximate an evaporator of the vehicle air conditioning system.

21. The method according to claim 18, wherein
the detecting changes in the operating condition is performed such that the operating condition is a refrigerant pressure detected in a low pressure section of the vehicle air conditioning system proximate an evaporator.

22. The method according to claim 18, wherein
the setting of the first upper limit and the second lower limit includes repeatedly re-adjusting the first upper limit and the second lower limit in response to re-determining a corresponding one of the first time delay and the second time delay.

* * * * *